US012621821B2

(12) United States Patent
Mu

(10) Patent No.: US 12,621,821 B2
(45) Date of Patent: May 5, 2026

(54) INDICATION INFORMATION-BASED METHOD AND DEVICE FOR TRANSMITTING UNCONTROLLED CHANNEL GRANT DATA

(71) Applicant: BEIJING XIAOMI MOBILE SOFTWARE CO., LTD., Beijing (CN)

(72) Inventor: Qin Mu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 467 days.

(21) Appl. No.: 18/034,605

(22) PCT Filed: Nov. 2, 2020

(86) PCT No.: PCT/CN2020/125995
§ 371 (c)(1),
(2) Date: Apr. 28, 2023

(87) PCT Pub. No.: WO2022/088197
PCT Pub. Date: May 5, 2022

(65) Prior Publication Data
US 2023/0413259 A1      Dec. 21, 2023

(51) Int. Cl.
*H04W 72/12*          (2023.01)
*H04W 72/52*          (2023.01)

(52) U.S. Cl.
CPC ........... *H04W 72/12* (2013.01); *H04W 72/52* (2023.01)

(58) Field of Classification Search
CPC ..... H04W 72/12; H04W 72/52; H04W 72/23; H04W 88/08; H04W 72/20; Y02D 30/70
See application file for complete search history.

(56) References Cited

U.S. PATENT DOCUMENTS

| | | | |
|---|---|---|---|
| 2015/0215964 A1* | 7/2015 | Damnjanovic | H04L 1/1607 370/329 |
| 2019/0045337 A1* | 2/2019 | Sun | H04W 72/23 |
| 2019/0222288 A1* | 7/2019 | Zhou | H04L 5/0044 |
| 2023/0254873 A1* | 8/2023 | Li | H04W 72/1273 |

FOREIGN PATENT DOCUMENTS

CN          102668492 A          9/2021

OTHER PUBLICATIONS

PCT/CN2020/125995, English translation of Search Report dated Jul. 21, 2021, 2 pages.

* cited by examiner

*Primary Examiner* — Joseph E Avellino
*Assistant Examiner* — Adam Joel Cerlanek
(74) *Attorney, Agent, or Firm* — Cozen O'Connor

(57)          ABSTRACT

A method for transmitting non-control channel scheduling data based on indication information includes determining whether the indication information is received before a preset moment of receiving the non-control channel scheduling data. The indication information is configured to indicate parameters of a terminal related to reception of the non-control channel scheduling data. Another method for transmitting non-control channel scheduling data based on indication information includes determining whether to send the indication information to a terminal before a preset moment of sending the non-control channel scheduling data, wherein the indication information is configured to indicate parameters of the terminal related to reception of the non-control channel scheduling data.

17 Claims, 6 Drawing Sheets determining whether the indication information is received before a preset moment of receiving the non-control channel scheduling data; in which the indication information is configured to indicate parameters of a terminal related to reception of the non-control channel scheduling data

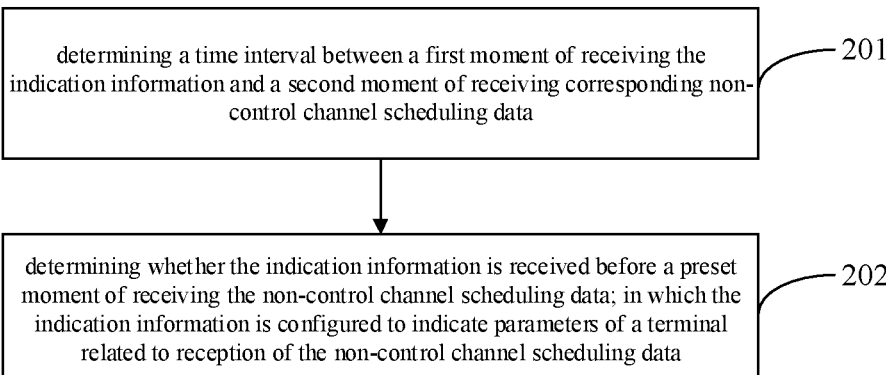

determining a time interval between a first moment of receiving the indication information and a second moment of receiving corresponding non-control channel scheduling data

201 determining whether the indication information is received before a preset moment of receiving the non-control channel scheduling data; in which the indication information is configured to indicate parameters of a terminal related to reception of the non-control channel scheduling data

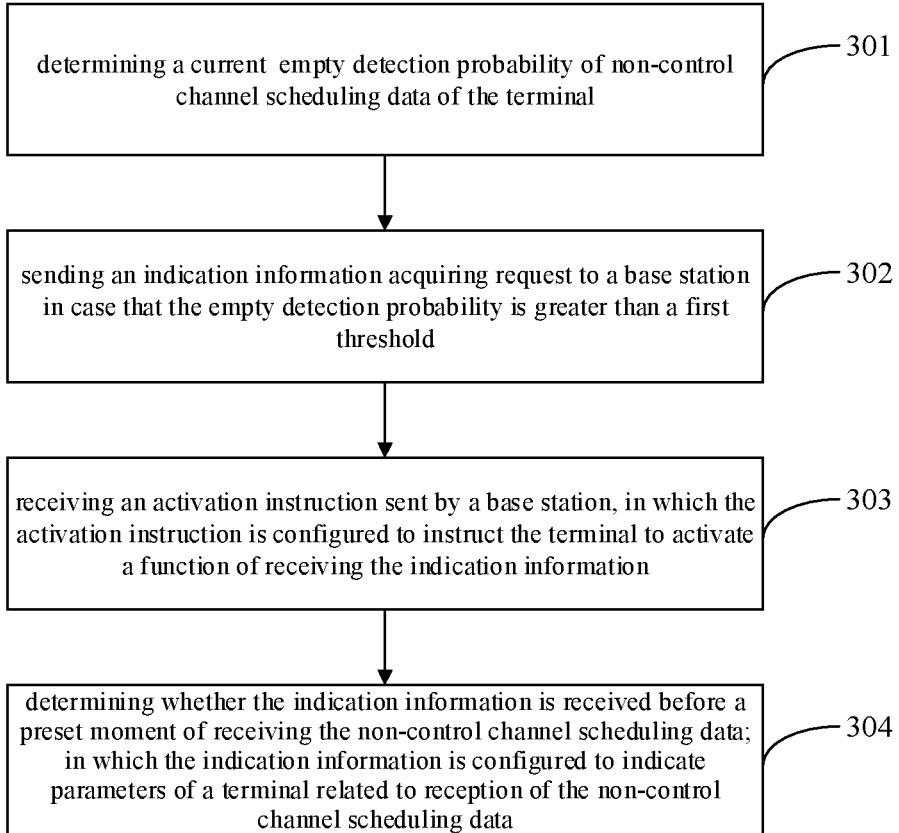

determining a current empty detection probability of non-control channel scheduling data of the terminal

301 sending an indication information acquiring request to a base station in case that the empty detection probability is greater than a first threshold

302 receiving an activation instruction sent by a base station, in which the activation instruction is configured to instruct the terminal to activate a function of receiving the indication information

303 determining whether the indication information is received before a preset moment of receiving the non-control channel scheduling data; in which the indication information is configured to indicate parameters of a terminal related to reception of the non-control channel scheduling data

304

FIG. 3 determining whether to send the indication information to a terminal before a preset moment of sending the non-control channel scheduling data, in which the indication information is configured to indicate parameters of the terminal related to reception of the non-control channel scheduling data ⟋— 401

FIG. 4 not sending the indication information in response to determining not to send the non-control channel scheduling data at the preset moment of sending the non-control channel scheduling data, in which the indication information is configured to indicate parameters of the terminal related to reception of the non-control channel scheduling data ⟋— 501

FIG. 5 not sending the indication information in response to determining not to send the non-control channel scheduling data at the preset moment of sending the non-control channel scheduling data, in which the indication information is configured to indicate parameters of the terminal related to reception of the non-control channel scheduling data ⟋— 601

FIG. 6 determining a time interval between a first moment of sending the indication information and a second moment of sending corresponding non-control channel scheduling data ⟋— 701 determining whether to send the indication information to a terminal before a preset moment of sending the non-control channel scheduling data, in which the indication information is configured to indicate parameters of the terminal related to reception of the non-control channel scheduling data ⟋— 702

FIG. 7

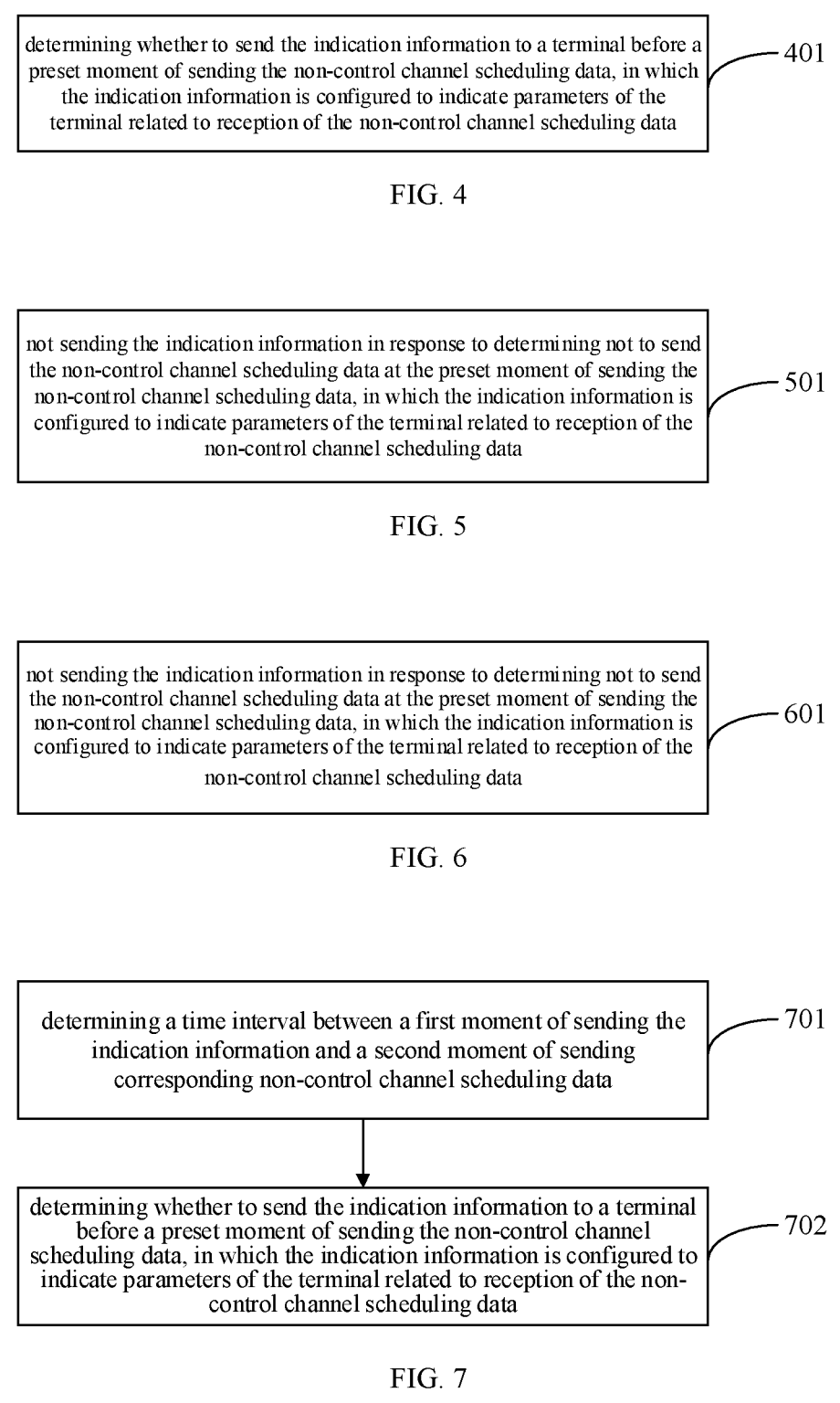

INDICATION INFORMATION-BASED METHOD AND DEVICE FOR TRANSMITTING UNCONTROLLED CHANNEL GRANT DATA

CROSS-REFERENCE TO RELATED APPLICATION

The present application is a national phase entry under 35 USC § 371 of International Application PCT/CN2020/125995, filed Nov. 2, 2020, the entire disclosures of which are incorporated herein by reference.

TECHNICAL FIELD

The present disclosure relates to a wireless communication technical field, and more particularly to a method and an apparatus for transmitting non-control channel scheduling data based on indication information, a terminal and a storage medium.

BACKGROUND

A traditional data scheduling process generally includes a network first sending a physical downlink control channel (PDCCH) to a terminal to carry scheduling information for subsequent data, such as a size of data to be transmitted, resource allocation, modulation and demodulation modes and the like. Therefore, in the case that the terminal sends or receives the data, the terminal first needs to receive and demodulate the PDCCH, and then sends or receives the data on specified resources according to a transmission format of the PDCCH. However, frequent demodulation of the PDCCH causes high power consumption of the terminal.

SUMMARY

The present disclosure provides a method for transmitting non-control channel scheduling data based on indication information, and a terminal.

According to an aspect of embodiments of the present disclosure, a method for transmitting non-control channel scheduling data based on indication information is provided, which is performed by a terminal and includes determining whether the indication information is received before a preset moment of receiving the non-control channel scheduling data. The indication information is configured to indicate parameters of a terminal related to reception of the non-control channel scheduling data.

According to another aspect of embodiments of the present disclosure, a method for transmitting non-control channel scheduling data based on indication information is provided, which is performed by a base station and includes determining whether to send the indication information to a terminal before a preset moment of sending the non-control channel scheduling data. The indication information is configured to indicate parameters of the terminal related to reception of the non-control channel scheduling data.

According to another aspect of embodiments of the present disclosure, a terminal is provided, which includes a transceiver, a memory, and a processor connected with the transceiver and the memory respectively, and configured to execute instructions stored in the memory and executable by a computer to control wireless signal transmission and reception of the transceiver, and to implement the above-mentioned method for transmitting non-control channel scheduling data based on indication information.

Additional aspects and advantages of the present disclosure will be given in part in the following descriptions, become apparent in part from the following descriptions, or be learned from the practice of the present disclosure.

BRIEF DESCRIPTION OF THE DRAWINGS

These and/or other aspects and advantages of the present disclosure will become apparent and more readily appreciated from the following descriptions of embodiments made with reference to the drawings, in which:

FIG. 1 is a flowchart illustrating a method for transmitting non-control channel scheduling data based on indication information according to an embodiment of the present disclosure;

FIG. 2 is a flowchart illustrating another method for transmitting non-control channel scheduling data based on indication information according to an embodiment of the present disclosure;

FIG. 3 is a flowchart illustrating still another method for transmitting non-control channel scheduling data based on indication information according to an embodiment of the present disclosure;

FIG. 4 is a flowchart illustrating yet another method for transmitting non-control channel scheduling data based on indication information according to an embodiment of the present disclosure;

FIG. 5 is a flowchart illustrating yet another method for transmitting non-control channel scheduling data based on indication information according to an embodiment of the present disclosure;

FIG. 6 is a flowchart illustrating another method for transmitting non-control channel scheduling data based on indication information according to an embodiment of the present disclosure;

FIG. 7 is a flowchart illustrating still another method for transmitting non-control channel scheduling data based on indication information according to an embodiment of the present disclosure;

DETAILED DESCRIPTION

Figure 8:
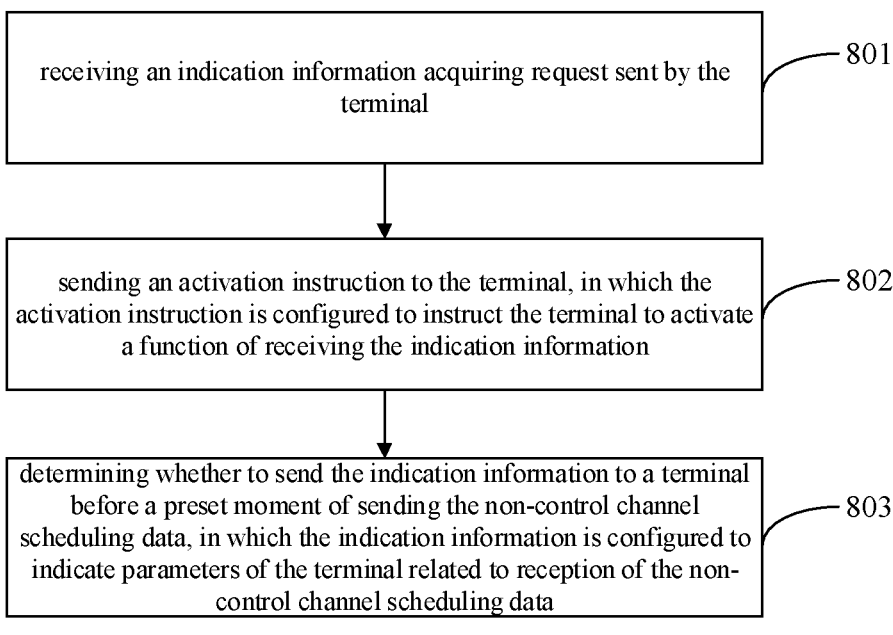
FIG. 8 is a flowchart illustrating yet another method for transmitting non-control channel scheduling data based on indication information according to an embodiment of the present disclosure.

Embodiments of the present disclosure are described in detail below, examples of which are illustrated in the drawings. When the following the accompanying drawings are described, the same or similar elements are denoted by same reference numerals in different drawings unless indicated otherwise. Implementations described in the following embodiments do not represent all implementations that are consistent with embodiments of the present disclosure. On the contrary, they are only examples of devices and methods that are consistent with some aspects of the embodiments of the present disclosure as detailed in the attached claims.

Terms used herein in the description of the present disclosure are only for the purpose of describing specific embodiments, but should not be construed to limit the present disclosure. As used in the description of the present disclosure and the appended claims, "a" and "the" in singular forms mean including plural forms, unless clearly indicated in the context otherwise. It should also be understood that, as used herein, the term "and/or" represents and contains any one and all possible combinations of one or more associated listed items.

It should be understood that, although terms such as "first," "second" and "third" are used herein for describing various information, these information should not be limited by these terms. These terms are only used for distinguishing information of the same type. For example, first information may also be called second information, and similarly, the second information may also be called the first information, without departing from the scope of the present disclosure. As used herein, the term "if" and "in case" may be construed to mean "when" or "upon" or "in response to determining" depending on the context.

Embodiments of the present disclosure are descried in detail as follows, examples of which are shown in the accompanying drawings, where the same or similar reference numerals represent the same or similar elements throughout. Embodiments described below with reference to the accompanying drawings are illustrative and intended to explain the present disclosure, but shall not be construed to limit the present disclosure.

In a related art, in long term evolution (LTE) and new radio (NR) communication services, mechanisms for scheduling data through non-control channel (such as semi persistent scheduling (SPS), scheduling based on a configured grant, etc.) may be introduced to configure a period of data transmission or reception, a size of a data packet, and data transmission format in advance, so as to enable the terminal to transmit or receive the data according to the specified data format at a predetermined time, thus avoiding demodulation of the PDCCH.

However, since a service period of the terminal may not match with a period supported by a mechanism for non-control channel scheduling data, the network generally sets a period for the terminal to obtain scheduling data as a relatively small value, so as to reduce transmission delay. However, the frequency of obtaining scheduling data by the terminal is too high, which not only makes it easy to obtain useless data that does not include service data, but also results in high power consumption.

In a related art, a mechanism of non-control channel scheduling data is introduced in a LTE/NR communication service, and a period of the terminal to obtain scheduling data is set as a relatively small value, which not only makes it easy to obtain useless data that does not include service data, but also results in high power consumption. For this, the present disclosure provides a method and an apparatus for transmitting non-control channel scheduling data based on indication information, a terminal and a storage medium, which are used to solve problems that in a related art of introducing a mechanism of non-control channel scheduling data to LTE/NR services and setting the period for the terminal to obtain scheduling data as a relatively small value, it is easy to obtain useless data that does not include service data, and power consumption is high.

In the method for transmitting the non-control channel scheduling data based the on indication information provided in the present disclosure, it is determined whether the indication information is received before a preset moment of receiving the non-control channel scheduling data. The indication information is configured to indicate parameters of the terminal related to reception of the non-control channel scheduling data. Therefore, before the scheduling data is received, the terminal determines whether the scheduling data needs to be received at a next receiving moment of receiving the scheduling data based on the indicating information, so that the terminal only receives the scheduling data when it is determined that the scheduling data at the next receiving moment is useful, which not only prevents the terminal from obtaining useless scheduling data, but also reduces the frequency of obtaining the scheduling data at the terminal and reduces the power consumption of the terminal.

The following is a detailed description of a method and an apparatus for transmitting non-control channel scheduling data based on indication information, a terminal and a storage medium provided in the present disclosure, with reference to the accompanying drawings.

FIG. 1 is a flowchart illustrating a method for transmitting non-control channel scheduling data based on indication information according to an embodiment of the present disclosure, which is performed by a terminal.

As shown in FIG. 1, the method for transmitting the non-control channel scheduling data based on the indication information includes the following steps.

In step 101, it is determined whether the indication information is received before a preset moment of receiving the non-control channel scheduling data. The indication information is configured to indicate parameters of a terminal related to reception of the non-control channel scheduling data.

In some embodiments of the present disclosure, it may be determined whether the indication information is received before each preset moment of receiving the non-control channel scheduling data, or it may be determined whether the indication information is received before a predetermined preset moment of receiving the non-control channel scheduling data.

It should be noted that the method for transmitting the non-control channel scheduling data based on the indication information in embodiments of the present disclosure may be applied to any terminal. The terminal may be a device that provides voice and/or data connectivity to users. The terminal may be communicated with one or more core networks through a radio access network (RAN). The terminal may be an Internet of Things terminal, such as a sensor device, a mobile phone (or called a "cellular" phone), and a computer with an Internet of Things terminal, such as a fixed device, a portable device, a pocket device, a handheld device, a computer built-in device or a vehicle mounted device. For example, the terminal may be a station (STA), a subscriber unit, a subscriber station, a mobile station, a mobile, a remote station, an access point, a remote terminal, an access terminal, a user terminal, a user agent, a user device, or a user equipment (UE). Alternatively, the terminal may be a device of an unmanned aerial vehicle. Alternatively, the terminal may be a vehicle mounted device, such as a vehicular computer with a wireless communication function or a wireless terminal connected to an external vehicular computer. Alternatively, the terminal may be a roadside device, such as a street light, a signal light, or other roadside devices with wireless communication functions.

It should be noted that in LTE/NR communication services, the introduction of a mechanism for scheduling data on non-control channels avoids demodulation of the PDCCH by the terminal to reduce power consumption of the terminal. Since a service period of the terminal may not match with a period supported by a mechanism for non-control channel scheduling data, the network generally sets a period for the terminal to obtain scheduling data as a relatively small value, so as to reduce transmission delay. However, since not all scheduling data contains useful service data, it is not only easy to obtain useless data that does not contain service data when the period of obtaining scheduling data at the terminal is small, but also power consumption is high, which cannot reduce the power consumption of the terminal.

The parameters related to reception of the non-control channel scheduling data may refer to parameters used to indicate whether the terminal needs to receive the non-control channel scheduling data.

The non-control channel scheduling data may be SPS information, or configured grant scheduling information, etc., which is not limited in embodiments of the present disclosure.

The preset moment of receiving the non-control channel scheduling data may be determined according to a preconfigured period of receiving the non-control channel scheduling data.

It should be noted that since a basic principle of a mechanism of the non-control channel scheduling data is that the network may configure in advance a period for the base station to send the non-control channel scheduling data, a period for the terminal to receive the non-control channel scheduling data, as well as a size of a data packet, a data transmission format and the like. Therefore, the terminal may determine each preset moment of receiving the non-control channel scheduling data according to the period of receiving non-control channel scheduling data contained in the network configuration information, and the base station may determine each preset moment of sending the non-control channel scheduling data according to the period of sending the non-control channel scheduling data contained in the network configuration information.

The indication information includes at least one of first information for instructing the terminal to receive the non-control channel scheduling data, or second information for instructing the terminal not to receive the non-control channel scheduling data.

In one possible implementation, in case that the terminal needs to receive the non-control channel scheduling data and in case that the terminal does not need to receive the non-control channel scheduling data, the base station may send the indication information to the terminal, and use different values to indicate whether the terminal receives the non-control channel scheduling data at the preset receiving moment. Therefore, the indication information may include the first information for instructing the terminal to receive the non-control channel scheduling data, and the second information for instructing the terminal not to receive the non-control channel scheduling data. The first information is different from the second information.

In another possible implementation, the base station may send the indication information to the terminal only when the terminal needs to receive the non-control channel scheduling data. Therefore, in this case, the indication information may only include the first information used to instruct the terminal to receive the non-control channel scheduling data. In case that the terminal does not need to receive control channel scheduling data, the terminal cannot obtain the indication information.

In embodiments of the present disclosure, the indication information is carried by a digital sequence.

Alternatively, in case that the indication information includes the first information and the second information, different digital sequences may be used to represent the first information and the second information. For example, the first information is 1, and the second information is 0. Alternatively, ZC sequences may be used to represent the indication information. For example, the first information is ZC sequence 1, and the second information is ZC sequence 2.

Alternatively, in case that the indication information only includes the first information, a digital sequence may be used to represent the first information. For example, the first information is 1. Alternatively, a ZC sequence may be used to represent the first information. For example, the first information is ZC sequence 1.

It should be noted that due to low self-correlation and cross-correlation of the digital sequences, the digital sequences are used to carry the indication information. In case that the terminal receives the indication information, the terminal may obtain the indication information without complex operations such as demodulation, thus improving the reading speed of the indication information at the terminal and saving power consumption of the terminal. In practical operations, a form of the digital sequence used to carry the indication information may be determined according to actual needs and specific application scenarios, which is not limited to a form of bits and ZC sequences listed above.

In embodiments of the present disclosure, after the terminal determines each preset moment of receiving the non-control channel scheduling data according to the preconfigured period of receiving the non-control channel scheduling data, the terminal may receive the indication information before each preset receiving moment arrives, and determine whether the non-control channel scheduling data is received at the preset receiving moment according to the indication information received.

Specifically, in response to the indication information received being the first information, it may be determined that the terminal needs to receive the non-control channel scheduling data at the corresponding preset receiving time, so that the terminal may receive the non-control channel scheduling data in case that the corresponding preset receiving moment arrives. In response to the indication information received being the second information or not receiving the indication information, it may be determined that the terminal does not need to receive the non-control channel scheduling data at the corresponding preset receiving moment. Therefore, in case that the corresponding preset receiving moment arrives, the non-control channel scheduling data may not be detected to reduce the frequency of receiving and parsing the non-control channel scheduling data at the terminal, and reduce the power consumption of the terminal.

It should be noted that the preset receiving moment corresponding to the indication information may be a preset receiving moment located after a moment of receiving the indication information and closest to the moment of receiving the indication information.

The method for transmitting the non-control channel scheduling data based on the indication information provided in embodiments of the present application may receive the indication information before each preset moment of receiving the non-control channel scheduling data. The indication information is configured to indicate whether the terminal needs to receive the non-control channel scheduling data. Therefore, before receiving the scheduling data, the terminal first determines whether the scheduling data needs to be received at a next receiving moment of receiving the scheduling data based on the indicating information, so that the terminal receives the scheduling data only when it is determined that the scheduling data at the next receiving moment is useful, which not only prevents the terminal from obtaining useless scheduling data, but also reduces the frequency of obtaining scheduling data at the terminal and reduces the power consumption of the terminal.

In one possible implementation of the present disclosure, since the processes of transmission at the base station, reception at the terminal, and parsing of indication information require a certain time period, a time interval between the moment of receiving the indication information and the corresponding preset receiving moment can be preset in advance, so that the terminal can obtain the corresponding indication information before the preset receiving moment arrives, so as to further improve the reliability of reception of non-control channel scheduling data.

The method for transmitting the non-control channel scheduling data based on the indication information provided in embodiments of the present disclosure is performed by the terminal, and includes:

determining to receive the non-control channel scheduling data at the preset moment of receiving the non-control channel scheduling data in response to receiving the indication information;

or determining not to receive the non-control channel scheduling data at the preset moment of receiving the non-control channel scheduling data in response to receiving the indication information;

or determining to receive the non-control channel scheduling data at the preset moment of receiving the non-control channel scheduling data in response to not receiving the indication information;

or determining not to receive the non-control channel scheduling data at the preset moment of receiving the non-control channel scheduling data in response to not receiving the indication information.

In some embodiments, the terminal may determine whether the indication information is received before the preset moment of receiving the non-control channel scheduling data. In this way, it is possible to determine whether to receive the non-control channel scheduling data at the preset moment of receiving the non-control channel scheduling data.

In the above-mentioned embodiments, the indication information may be used to indict the terminal whether there is non-control channel scheduling data for the terminal at the preset moment of receiving the non-control channel scheduling data. That is, the indication information may be used to indicate to receive the non-control channel scheduling data, or the indication information may be used to indicate not to receive the non-control channel scheduling data.

In some embodiments, in case of receiving the indication information, it is determined to receive the non-control channel scheduling data at the preset receiving moment. For example, those embodiments may be applied to scenarios with infrequent interaction, where the non-control channel scheduling data is received at the preset receiving moment only when the indication information is received.

In some further embodiments, in case of receiving the indication information, it is determined not to receive the non-control channel scheduling data at the preset receiving moment. For example, those embodiments may be applied in scenarios with frequent interaction, where the preset receiving moment is skipped, and there is no need to receive the non-control channel scheduling data only when the indication information is received.

In yet other embodiments, in case of not receiving the indication information, it is determined to receive the non-control channel scheduling data at the preset receiving moment. For example, those embodiments may be applied to scenarios with frequent interaction, where the non-control channel scheduling data is received at the preset receiving moment as long as no indication information is received.

In still other embodiments, in case of not receiving the indication information, it is determined not to receive the non-control channel scheduling data at the preset receiving moment. For example, those embodiments may be applied to scenarios with frequent interaction, where the preset receiving moment is skipped, and there is no need to receive the non-control channel scheduling data only when the indication information is received.

In embodiments of the present disclosure, it may be determined whether the indication information is received before each preset moment of receiving the non-control channel scheduling data, or determined whether the indication information is received before the predetermined preset moment of receiving the non-control channel scheduling data.

The method for transmitting the non-control channel scheduling data based on the indication information provided in embodiments of the present disclosure is performed by the terminal, and includes:

receiving the indication information before a preset moment of receiving the non-control channel scheduling data; in which the indication information is configured to indicate whether the non-control channel scheduling data is received.

In the above-mentioned embodiments, the indication information may include an indicator or a character field. In case that the indicator or the character field is set as a first value, the indicator or the character field is used to indicate the terminal to receive the non-control channel scheduling data at the preset moment of receiving the non-control channel scheduling data. In case that the indicator or the character field is set as a second value, the indicator or the character field is used to indicate the terminal not to receive the non-control channel scheduling data at the preset moment of receiving the non-control channel scheduling data.

In the above-mentioned embodiments, the indication information may be used to indicate the terminal whether there is non-control channel scheduling data for the terminal at the preset moment of receiving the non-control channel scheduling data.

In embodiments of the present disclosure, it is possible to determine whether the indication information is received before each preset moment of receiving the non-control channel scheduling data, and it is also possible to determine whether the indication information is received before the predetermined preset moment of receiving the non-control channel scheduling data.

Referring to FIG. 2, another method for transmitting non-control channel scheduling data based on indication information provided in an embodiment of the present disclosure is further described below.

FIG. 2 is a flowchart illustrating another method for transmitting non-control channel scheduling data based on indication information according to an embodiment of the present disclosure, which is performed by a terminal. The solution shown in FIG. 2 may be implemented separately or in combination with any one of embodiments of the present disclosure.

As shown in FIG. 2, the method for transmitting the non-control channel scheduling data based on the indication information includes the following steps.

In step 201, a time interval between a first moment of receiving the indication information and a second moment of receiving corresponding non-control channel scheduling data is determined.

The second moment of receiving the corresponding non-control channel scheduling data may refer to a preset receiving moment that is after the first moment of receiving the indication information and closest to the first moment.

In embodiments of the present disclosure, since a certain time period is required for the terminal to receive and parse the indication information, a certain time interval is required between the first moment of receiving the indication information at the terminal and the second moment of receiving the corresponding non-control channel scheduling data at the terminal, so that the terminal may effectively read the corresponding indication information before each preset receiving moment arrives, so as to reliably determine whether it is required to receive the non-control channel scheduling data at the corresponding preset receiving moment.

It should be noted that the time interval between the first moment and the second moment may be configured by network managers according to actual application needs and application scenarios. Therefore, the terminal may obtain the time interval between the first moment and the second moment from the network configuration information, and then determine each first moment of receiving the indication information according to each preset receiving moment and the time interval determined between the first moment and the second moment, so as to receive the indication information at each first moment.

Furthermore, since factors such as a load capacity of the terminal, a network configuration, and a communication protocol may affect a processing speed of the indication information at the network and the terminal, the time interval between the first moment and the second moment may be determined according to the load capacity of the terminal, the network configuration, the communication protocol and the like. In one possible implementation of the present disclosure, the above-mentioned step 201 may include:

determining the time interval between the first moment of receiving the indication information and the second moment of receiving the corresponding non-control channel scheduling data according to at least one of parameters, in which at least one of the parameters is a load capability of the terminal, a network configuration, or a communication protocol.

In some embodiments of the present disclosure, the terminal may determine the time interval between the first moment of receiving the indication information and the second moment of receiving the corresponding non-control channel scheduling data according to at least one of the load capability of the terminal, the network configuration, or the communication protocol.

In one possible implementation, the time interval between the first moment and the second moment may be predetermined in a communication protocol, so the terminal may obtain a communication protocol between the terminal and the base station, and obtain the time interval between the first moment and the second moment from the communication protocol.

In another possible implementation, the time interval between the first moment and the second moment may be configured via network, so the terminal may obtain the time interval between the first moment and the second moment from the network configuration information.

In still another possible implementation, the load capacity of the terminal may affect a parsing speed of parsing the indication information at the terminal, so the terminal may determine the time interval between the first moment and the second moment according to the load capacity of the terminal.

In yet another possible implementation, since the time interval included in the communication protocol and the network configuration information may be set by the base station according to the current communication protocol and network configuration, without considering the load capacity of the terminal. Therefore, after obtaining the time interval between the first moment and the second moment from the communication protocol or the network configuration information, the terminal may correct the time interval obtained according to its own load capacity to make the time interval corrected adapt to its own load capacity.

It should be noted that a way for determining the time interval between the first moment and the second moment may include but are not limited to the above-listed situations. In actual applications, the way for determining the time interval may be set according to actual needs and specific service scenarios, which is not limited in embodiments of the present disclosure.

In step 202, before the preset moment of receiving the non-control channel scheduling data, it is determined whether the indication information is received. The indication information is configured to indicate parameters of the terminal related to reception of the non-control channel scheduling data.

In embodiments of the present disclosure, it is possible to determine whether the indication information is received before each preset moment of receiving the non-control channel scheduling data, and it is also possible to determine whether the indication information is received before the predetermined preset moment of receiving the non-control channel scheduling data.

In some embodiments, determining whether the indication information is received includes:

determining to receive the non-control channel scheduling data at the preset moment of receiving the non-control channel scheduling data in response to receiving the indication information;

or determining not to receive the non-control channel scheduling data at the preset moment of receiving the non-control channel scheduling data in response to receiving the indication information;

or determining to receive the non-control channel scheduling data at the preset moment of receiving the non-control channel scheduling data in response to not receiving the indication information;

or determining not to receive the non-control channel scheduling data at the preset moment of receiving the non-control channel scheduling data in response to not receiving the indication information.

In some embodiments, determining whether the indication information is received includes:

receiving the indication information before the preset moment of receiving the non-control channel scheduling data, in which the indication information is used to indicate whether to receive the non-control channel scheduling data.

In the above-mentioned embodiments, the indication information may include an indicator or a character field. In case that the indicator or the character field is set as a first value, the indicator or the character field is used to indicate the terminal to receive the non-control channel scheduling data at the preset moment of receiving the non-control channel scheduling data. In case that the indicator or the character field is set as a second value, the indicator or the character field is used to indicate the terminal not to receive the non-control channel scheduling data at the preset moment of receiving the non-control channel scheduling data. It should be noted that the method for transmitting the non-control channel scheduling data based on the indication information in embodiments of the present disclosure may be applied to any terminal. The terminal may be a device that provides voice and/or data connectivity to users. The terminal may be communicated with one or more core networks through a radio access network (RAN). The terminal may be an Internet of Things terminal, such as a sensor device, a mobile phone (or called a "cellular" phone), and a computer with an Internet of Things terminal, such as a fixed device, a portable device, a pocket device, a handheld device, a computer built-in device or a vehicle mounted device. For example, the terminal may be a station (STA), a subscriber unit, a subscriber station, a mobile station, a mobile, a remote station, an access point, a remote terminal, an access terminal, a user terminal, a user agent, a user device, or a user equipment (UE). Alternatively, the terminal may be a device of an unmanned aerial vehicle. Alternatively, the terminal may be a vehicle mounted device, such as a vehicular computer with a wireless communication function or a wireless terminal connected to an external vehicular computer. Alternatively, the terminal may be a roadside device, such as a street light, a signal light, or other roadside devices with wireless communication functions.

It should be noted that in LTE/NR communication services, the introduction of a mechanism for scheduling data on non-control channels avoids demodulation of the PDCCH by the terminal to reduce power consumption of the terminal. Since a service period of the terminal may not match with a period supported by a mechanism for non-control channel scheduling data, the network generally sets a period for the terminal to obtain scheduling data as a relatively small value, so as to reduce transmission delay. However, since not all scheduling data contains useful service data, it is not only easy to obtain useless data that does not contain service data when the period of obtaining scheduling data at the terminal is small, but also power consumption is high, which cannot reduce the power consumption of the terminal.

The parameters related to reception of the non-control channel scheduling data may refer to parameters used to indicate whether the terminal needs to receive the non-control channel scheduling data.

The non-control channel scheduling data may be SPS information, or configured grant scheduling information, etc., which is not limited in embodiments of the present disclosure.

The preset moment of receiving the non-control channel scheduling data may be determined according to a preconfigured period of receiving the non-control channel scheduling data.

It should be noted that since a basic principle of a mechanism of the non-control channel scheduling data is that the network may configure in advance a period for the base station to send the non-control channel scheduling data, a period for the terminal to receive the non-control channel scheduling data, as well as a size of a data packet, a data transmission format and the like. Therefore, the terminal may determine each preset moment of receiving the non-control channel scheduling data according to the period of receiving non-control channel scheduling data contained in the network configuration information, and the base station may determine each preset moment of sending the non-control channel scheduling data according to the period of sending the non-control channel scheduling data contained in the network configuration information.

The indication information includes at least one of first information for instructing the terminal to receive the non-control channel scheduling data, or second information for instructing the terminal not to receive the non-control channel scheduling data.

In one possible implementation, in case that the terminal needs to receive the non-control channel scheduling data and in case that the terminal does not need to receive the non-control channel scheduling data, the base station may send the indication information to the terminal, and use different values to indicate whether the terminal receives the non-control channel scheduling data at the preset receiving moment. Therefore, the indication information may include the first information for instructing the terminal to receive the non-control channel scheduling data, and the second information for instructing the terminal not to receive the non-control channel scheduling data. The first information is different from the second information.

In another possible implementation, the base station may send the indication information to the terminal only when the terminal needs to receive the non-control channel scheduling data. Therefore, in this case, the indication information may only include the first information used to instruct the terminal to receive the non-control channel scheduling data. In case that the terminal does not need to receive control channel scheduling data, the terminal cannot obtain the indication information.

In embodiments of the present disclosure, the indication information is carried by a digital sequence.

Alternatively, in case that the indication information includes the first information and the second information, different digital sequences may be used to represent the first information and the second information. For example, the first information is 1, and the second information is 0. Alternatively, ZC sequences may be used to represent the indication information. For example, the first information is ZC sequence 1, and the second information is ZC sequence 2.

Alternatively, in case that the indication information only includes the first information, a digital sequence may be used to represent the first information. For example, the first information is 1. Alternatively, a ZC sequence may be used to represent the first information. For example, the first information is ZC sequence 1.

It should be noted that due to low self-correlation and cross-correlation of the digital sequences, the digital sequences are used to carry the indication information. In case that the terminal receives the indication information, the terminal may obtain the indication information without complex operations such as demodulation, thus improving the reading speed of the indication information at the terminal and saving power consumption of the terminal. In practical operations, a form of the digital sequence used to carry the indication information may be determined according to actual needs and specific application scenarios, which is not limited to a form of bits and ZC sequences listed above.

In embodiments of the present disclosure, after determining each preset moment of receiving the non-control channel scheduling data and the time interval between the first moment and the second time according to the preconfigured period of receiving the non-control channel scheduling data, the terminal may determine, as each first moment, a moment before each preset receiving moment whose difference with each preset receiving moment is the time interval, receive indication information at each first moment, and determine whether the non-control channel scheduling data needs to be received at the preset receiving moment according to the indication information received.

Specifically, in response to the indication information received being the first information, it may be determined that the terminal needs to receive the non-control channel scheduling data at the corresponding preset receiving moment, so that the terminal may receive the non-control channel scheduling data in case that the corresponding preset receiving moment arrives. In response to the indication information received being the second information or not receiving the indication information, it may be determined that the terminal does not need to receive the non-control channel scheduling data at the corresponding preset receiving moment. Therefore, in case that the corresponding preset receiving moment arrives, the non-control channel scheduling data may not be detected to reduce the frequency of receiving and parsing the non-control channel scheduling data at the terminal, and reduce the power consumption of the terminal.

It should be noted that the preset receiving moment corresponding to the indication information may be a preset receiving moment located after a moment of receiving the indication information and closest to the moment of receiving the indication information.

The method for transmitting the non-control channel scheduling data based on the indication information provided in embodiments of the present application may determine the time interval between the first moment of receiving the indication information and the second moment of receiving corresponding non-control channel scheduling data before receiving the indication information, and determine whether to receive the indication information before each preset moment of receiving the non-control channel scheduling data according to the time interval. The indication information is configured to indicate parameters of the terminal related to reception of the non-control channel scheduling data. Therefore, by presetting the time interval between the moment of receiving the indication information and the corresponding preset receiving moment in advance, and first determining whether to receive the scheduling data at a next moment of receiving the scheduling data through the indication information before receiving the scheduling data, the terminal receives the scheduling data only when it is determined that the scheduling data at the next receiving moment is useful, which not only prevents the terminal from obtaining useless scheduling data, but also reduces the power consumption of the terminal and enables the terminal to effectively read the corresponding indication information before the preset receiving moment arrives, thus further improving the reliability of receiving the non-control channel scheduling data.

In one possible implementation of the present disclosure, since detecting indication information consumes the power of the terminal, it is possible to use the indication information to determine whether the non-control channel scheduling data information needs to be received in case that the empty detection probability of scheduling data is high based on actual situations, so as to further reduce the power consumption of the terminal.

Referring to FIG. 3, still another method for transmitting non-control channel scheduling data based on indication information provided in an embodiment of the present disclosure is further described below.

FIG. 3 is a flowchart illustrating still another method for transmitting non-control channel scheduling data based on indication information according to an embodiment of the present disclosure, which is performed by a terminal.

As shown in FIG. 3, the method for transmitting the non-control channel scheduling data based on the indication information includes the following steps.

In step 301, a current empty detection probability of non-control channel scheduling data of the terminal is determined.

The empty detection probability may be determined according to the number of times the terminal receives the non-control channel scheduling data within a certain current period of time, and the number of pieces of the non-control channel scheduling data received. Alternatively, assuming that the number of pieces of the non-control channel scheduling data received by the terminal within a certain current period of time is a, and the number of times the non-control channel scheduling data is received is b, $1-a/b$ may be determined as the current empty detection probability of non-control channel scheduling data of the terminal. It should be noted that the empty detection probability may reflect a proportion for which the terminal does not receive useful non-control channel scheduling data at the preset receiving moment.

In embodiments of the present disclosure, since the empty detection probability of the non-control channel scheduling data of the terminal may vary in real time, a frequency of determining the empty detection probability may be preset, allowing the terminal to determine a moment to calculate the empty detection probability according to the preset frequency, and calculate a current time period at which the moment of receiving the non-control channel scheduling data for calculating the empty detection probability falls within, so that the terminal may determine a real-time empty detection probability of the terminal during each time period in time.

For example, the preset frequency of determining the empty detection probability is 1 hour/times. The last moment to determine the empty detection probability is 10:00, and the current moment is 11:00. Therefore, the current time period may be determined to be 10:00 to 11:00, and the terminal may calculate the current empty detection probability at 11:00. Assuming that the number of times the terminal receives the non-control channel scheduling data is N and the number of pieces of non-control channel scheduling data received by the terminal is M during the current period of 10:00 to 11:00, it may be determined that the empty detection probability of the terminal during the current period of 10:00 to 11:00 is 1-N/M.

It should be noted that the above-mentioned examples are only illustrative and cannot be considered as limiting the present disclosure. In actual applications, the frequency of determining the empty detection probability may be set according to actual needs and specific service scenarios, such as 1 hour/times, 2 hours/times, 24 hours/times, etc., which is not limited in embodiments of the present disclosure.

In step 302, an indication information acquiring request is sent to a base station in case that the empty detection probability is greater than a first threshold.

In embodiments of the present disclosure, the higher current empty detection probability of the terminal indicates that a proportion that cannot receive useful non-control channel scheduling data is relatively large when the terminal receives the non-control channel scheduling data at a predetermined data reception period, thus increasing unnecessary power consumption of the terminal. Therefore, when the empty detection probability is relatively high, it is possible to determine whether the non-control channel scheduling data needs to be obtained at each preset receiving moment through the indication information.

In one possible implementation, the first threshold may be preset according to actual needs, and when the current empty detection probability is determined to be greater than the first threshold, it is determined that the current empty detection probability of the terminal is relatively high. Therefore, the terminal may send the indication information acquiring request to the base station to determine whether non-control channel scheduling data needs to be obtained at each preset receiving moment through the indication information, thus reducing the frequency of receiving the non-control channel scheduling data at the terminal and reducing the power consumption of the terminal.

In step 303, an activation instruction sent by a base station is received. The activation instruction is configured to instruct the terminal to activate a function of receiving the indication information.

In embodiments of the present disclosure, after sending the indication information acquiring request to the base station, the terminal may receive the activation instruction sent by the base station in real time to activate a function of receiving the indication information upon receiving the activation instruction sent by the base station. Before receiving the non-control channel scheduling data in the future, the terminal first obtains the indication information to determine whether the non-control channel scheduling data needs to be received at a next preset receiving moment based on the indication information.

Alternatively, the terminal may obtain the activation instruction from a high-level signaling issued by the base station, or obtain the activation instruction from a dynamic signaling issued by the base station.

It should be noted that determining the current empty detection probability of the non-control channel scheduling data of the terminal may be performed by the base station, which may actively send the activation instruction to the terminal to enable the terminal to receive the indication information in case of determining the empty detection probability being greater than the first threshold. In one embodiment of the present disclosure, the above-mentioned steps 301 to 302 may be omitted.

In step 304, it is determined whether the indication information is received before the preset moment of receiving the non-control channel scheduling data. The indication information is configured to indicate parameters of a terminal related to reception of the non-control channel scheduling data.

In embodiments of the present disclosure, it is possible to determine whether the indication information is received before each preset moment of receiving the non-control channel scheduling data, and it is also possible to determine whether the indication information is received before the predetermined preset moment of receiving the non-control channel scheduling data.

In some embodiments, determining whether the indication information is received includes:

determining to receive the non-control channel scheduling data at the preset moment of receiving the non-control channel scheduling data in response to receiving the indication information;

or determining not to receive the non-control channel scheduling data at the preset moment of receiving the non-control channel scheduling data in response to receiving the indication information;

or determining to receive the non-control channel scheduling data at the preset moment of receiving the non-control channel scheduling data in response to not receiving the indication information;

or determining not to receive the non-control channel scheduling data at the preset moment of receiving the non-control channel scheduling data in response to not receiving the indication information.

In some embodiments, determining whether the indication information is received includes:

receiving the indication information before a preset moment of receiving the non-control channel scheduling data; in which the indication information is configured to indicate whether to receive the non-control channel scheduling data.

In the above-mentioned embodiments, the indication information may include an indicator or a character field. In case that the indicator or the character field is set as a first value, the indicator or the character field is used to indicate the terminal to receive the non-control channel scheduling data at the preset moment of receiving the non-control channel scheduling data. In case that the indicator or the character field is set as a second value, the indicator or the character field is used to indicate the terminal not to receive the non-control channel scheduling data at the preset moment of receiving the non-control channel scheduling data.

It should be noted that the method for transmitting the non-control channel scheduling data based on the indication information in embodiments of the present disclosure may be applied to any terminal. The terminal may be a device that provides voice and/or data connectivity to users. The terminal may be communicated with one or more core networks through a radio access network (RAN). The terminal may be an Internet of Things terminal, such as a sensor device, a mobile phone (or called a "cellular" phone), and a computer with an Internet of Things terminal, such as a fixed device, a portable device, a pocket device, a handheld device, a computer built-in device or a vehicle mounted device. For example, the terminal may be a station (STA), a subscriber unit, a subscriber station, a mobile station, a mobile, a remote station, an access point, a remote terminal, an access terminal, a user terminal, a user agent, a user device, or a user equipment (UE). Alternatively, the terminal may be a device of an unmanned aerial vehicle. Alternatively, the terminal may be a vehicle mounted device, such as a vehicular computer with a wireless communication function or a wireless terminal connected to an external vehicular computer. Alternatively, the terminal may be a roadside device, such as a street light, a signal light, or other roadside devices with wireless communication functions.

It should be noted that in LTE/NR communication services, the introduction of a mechanism for scheduling data on non-control channels avoids demodulation of the PDCCH by the terminal to reduce power consumption of the terminal. Since a service period of the terminal may not match with a period supported by a mechanism for non-control channel scheduling data, the network generally sets a period for the terminal to obtain scheduling data as a relatively small value, so as to reduce transmission delay. However, since not all scheduling data contains useful service data, it is not only easy to obtain useless data that does not contain service data when the period of obtaining scheduling data at the terminal is small, but also power consumption is high, which cannot reduce the power consumption of the terminal.

The parameters related to reception of the non-control channel scheduling data may refer to parameters used to indicate whether the terminal needs to receive the non-control channel scheduling data.

The non-control channel scheduling data may be SPS information, or configured grant scheduling information, etc., which is not limited in embodiments of the present disclosure.

The preset moment of receiving the non-control channel scheduling data may be determined according to a preconfigured period of receiving the non-control channel scheduling data.

It should be noted that since a basic principle of a mechanism of the non-control channel scheduling data is that the network may configure in advance a period for the base station to send the non-control channel scheduling data, a period for the terminal to receive the non-control channel scheduling data, as well as a size of a data packet, a data transmission format and the like. Therefore, the terminal may determine each preset moment of receiving the non-control channel scheduling data according to the period of receiving non-control channel scheduling data contained in the network configuration information, and the base station may determine each preset moment of sending the non-control channel scheduling data according to the period of sending the non-control channel scheduling data contained in the network configuration information.

The indication information includes at least one of first information for instructing the terminal to receive the non-control channel scheduling data, or second information for instructing the terminal not to receive the non-control channel scheduling data.

In one possible implementation, in case that the terminal needs to receive the non-control channel scheduling data and in case that the terminal does not need to receive the non-control channel scheduling data, the base station may send the indication information to the terminal, and use different values to indicate whether the terminal receives the non-control channel scheduling data at the preset receiving moment. Therefore, the indication information may include the first information for instructing the terminal to receive the non-control channel scheduling data, and the second information for instructing the terminal not to receive the non-control channel scheduling data. The first information is different from the second information.

In another possible implementation, the base station may send the indication information to the terminal only when the terminal needs to receive the non-control channel scheduling data. Therefore, in this case, the indication information may only include the first information used to instruct the terminal to receive the non-control channel scheduling data. In case that the terminal does not need to receive control channel scheduling data, the terminal cannot obtain the indication information.

In embodiments of the present disclosure, the indication information is carried by a digital sequence.

Alternatively, in case that the indication information includes the first information and the second information, different digital sequences may be used to represent the first information and the second information. For example, the first information is 1, and the second information is 0. Alternatively, ZC sequences may be used to represent the indication information. For example, the first information is ZC sequence 1, and the second information is ZC sequence 2.

Alternatively, in case that the indication information only includes the first information, a digital sequence may be used to represent the first information. For example, the first information is 1. Alternatively, a ZC sequence may be used to represent the first information. For example, the first information is ZC sequence 1.

It should be noted that due to low self-correlation and cross-correlation of the digital sequences, the digital sequences are used to carry the indication information. In case that the terminal receives the indication information, the terminal may obtain the indication information without complex operations such as demodulation, thus improving the reading speed of the indication information at the terminal and saving power consumption of the terminal. In practical operations, a form of the digital sequence used to carry the indication information may be determined according to actual needs and specific application scenarios, which is not limited to a form of bits and ZC sequences listed above.

In embodiments of the present disclosure, after determining each preset moment of receiving the non-control channel scheduling data according to the preconfigured period of receiving the non-control channel scheduling data, the terminal may receive the indication information before each preset receiving moment arrives, and determine whether to receive the the non-control channel scheduling data at the preset receiving moment according to the indication information received.

Specifically, in response to the indication information received being the first information, it may be determined that the terminal needs to receive the non-control channel scheduling data at the corresponding preset receiving moment, so that the terminal may receive the non-control channel scheduling data in case that the corresponding preset receiving moment arrives. In response to the indication information received being the second information or not receiving the indication information, it may be determined that the terminal does not need to receive the non-control channel scheduling data at the corresponding preset receiving moment. Therefore, in case that the corresponding preset receiving moment arrives, the non-control channel scheduling data may not be detected to reduce the frequency of receiving and parsing the non-control channel scheduling data at the terminal, and reduce the power consumption of the terminal.

It should be noted that the preset receiving moment corresponding to the indication information may be a preset receiving moment located after a moment of receiving the indication information and closest to the moment of receiving the indication information.

The method for transmitting the non-control channel scheduling data based on the indication information provided in embodiments of the present application may send the indication information acquiring request to the base station in case that the current empty detection probability of the non-control channel scheduling data of the terminal is greater than the first threshold, and receive the activation instruction sent by the base station to activate the function of receiving the indication information. Therefore, before each preset moment of receiving the non-control channel scheduling data, it is determined whether the indication information is received, and the indication information is configured to indicate parameters of the terminal related to reception of the non-control channel scheduling data. Therefore, in case that the empty detection probability of the scheduling data is high, the indication information is used to determine whether the non-control channel scheduling data needs to be received, so as to reduce the power consumption of the terminal upon reception and parsing of the indication information, which not only prevents the terminal from acquiring useless scheduling data and reduces the frequency of acquiring scheduling data at the terminal, but also further reduces the power consumption of the terminal.

FIG. 4 is a flowchart illustrating yet another method for transmitting non-control channel scheduling data based on indication information according to an embodiment of the present disclosure, which is performed by a base station.

As shown in FIG. 4, the method for transmitting the non-control channel scheduling data based on the indication information includes the following steps.

In step 401, it is determined whether to send the indication information to a terminal before a preset moment of sending the non-control channel scheduling data. The indication information is configured to indicate parameters of the terminal related to reception of the non-control channel scheduling data.

In embodiments of the present disclosure, the base station may determine whether to send the indication information before each preset moment of sending the non-control channel scheduling data, or determine whether to send the indication information before a predetermined preset moment of sending the non-control channel scheduling data.

In some embodiments, determining whether to send the indication information includes:

sending the non-control channel scheduling data in response to determining to send the indication information at the preset moment of sending the non-control channel scheduling data;

or sending the indication information in response to determining not to send the non-control channel scheduling data at the preset moment of sending the non-control channel scheduling data;

or not sending the indication information in response to determining to send the non-control channel scheduling data at the preset moment of sending the non-control channel scheduling data;

or not sending the indication information in response to determining not to send the non-control channel scheduling data at the preset moment of sending the non-control channel scheduling data.

In some embodiments, determining whether to send the indication information includes:

sending the indication information before the preset moment of sending the non-control channel scheduling data, in which the indication information is used to indicate whether to receive the non-control channel scheduling data.

In the above-mentioned embodiments, the indication information may include an indicator or a character field. In case that the indicator or the character field is set as a first value, the indicator or the character field is used to indicate the terminal to receive the non-control channel scheduling data at the preset moment of receiving the non-control channel scheduling data. In case that the indicator or the character field is set as a second value, the indicator or the character field is used to indicate the terminal not to receive the non-control channel scheduling data at the preset moment of receiving the non-control channel scheduling data.

It should be noted that the method for transmitting the non-control channel scheduling data based on the indication information in embodiments of the present disclosure may be applied to any terminal. The terminal may be a device that provides voice and/or data connectivity to users. The terminal may be communicated with one or more core networks through a radio access network (RAN). The terminal may be an Internet of Things terminal, such as a sensor device, a mobile phone (or called a "cellular" phone), and a computer with an Internet of Things terminal, such as a fixed device, a portable device, a pocket device, a handheld device, a computer built-in device or a vehicle mounted device. For example, the terminal may be a station (STA), a subscriber unit, a subscriber station, a mobile station, a mobile, a remote station, an access point, a remote terminal, an access terminal, a user terminal, a user agent, a user device, or a user equipment (UE). Alternatively, the terminal may be a device of an unmanned aerial vehicle. Alternatively, the terminal may be a vehicle mounted device, such as a vehicular computer with a wireless communication function or a wireless terminal connected to an external vehicular computer. Alternatively, the terminal may be a roadside device, such as a street light, a signal light, or other roadside devices with wireless communication functions.

It should be noted that in LTE/NR communication services, the introduction of a mechanism for scheduling data on non-control channels avoids demodulation of the PDCCH by the terminal to reduce power consumption of the terminal. Since a service period of the terminal may not match with a period supported by a mechanism for non-control channel scheduling data, the network generally sets a period for the terminal to obtain scheduling data as a relatively small value, so as to reduce transmission delay. However, since not all scheduling data contains useful service data, it is not only easy to obtain useless data that does not contain service data when the period of obtaining scheduling data at the terminal is small, but also power consumption is high, which cannot reduce the power consumption of the terminal.

The parameters related to reception of the non-control channel scheduling data may refer to parameters used to indicate whether the terminal needs to receive the non-control channel scheduling data.

The non-control channel scheduling data may be SPS information, or configured grant scheduling information, etc., which is not limited in embodiments of the present disclosure.

The preset moment of sending the non-control channel scheduling data may be determined according to a preconfigured period of sending the non-control channel scheduling data.

It should be noted that since a basic principle of a mechanism of the non-control channel scheduling data is that the network may configure in advance a period for the base station to send the non-control channel scheduling data, a period for the terminal to receive the non-control channel scheduling data, as well as a size of a data packet, a data transmission format and the like. Therefore, the terminal may determine each preset moment of receiving the non-control channel scheduling data according to the period of receiving non-control channel scheduling data contained in the network configuration information, and the base station may determine each preset moment of sending the non-control channel scheduling data according to the period of sending the non-control channel scheduling data contained in the network configuration information.

The indication information includes at least one of first information for instructing the terminal to receive the non-control channel scheduling data, or second information for instructing the terminal not to receive the non-control channel scheduling data.

In one possible implementation, in case that the terminal needs to receive the non-control channel scheduling data and in case that the terminal does not need to receive the non-control channel scheduling data, the base station may send the indication information to the terminal, and use different values to indicate whether the terminal receives the non-control channel scheduling data at the preset receiving moment. Therefore, the indication information may include the first information for instructing the terminal to receive the non-control channel scheduling data, and the second information for instructing the terminal not to receive the non-control channel scheduling data. The first information is different from the second information.

In another possible implementation, the base station may send the indication information to the terminal only when the terminal needs to receive the non-control channel scheduling data. Therefore, in this case, the indication information may only include the first information used to instruct the terminal to receive the non-control channel scheduling data. In case that the terminal does not need to receive control channel scheduling data, the terminal cannot obtain the indication information.

In embodiments of the present disclosure, the indication information is carried by a digital sequence.

Alternatively, in case that the indication information includes the first information and the second information, different digital sequences may be used to represent the first information and the second information. For example, the first information is 1, and the second information is 0. Alternatively, ZC sequences may be used to represent the indication information. For example, the first information is ZC sequence 1, and the second information is ZC sequence 2.

Alternatively, in case that the indication information only includes the first information, a digital sequence may be used to represent the first information. For example, the first information is 1. Alternatively, a ZC sequence may be used to represent the first information. For example, the first information is ZC sequence 1.

It should be noted that due to low self-correlation and cross-correlation of the digital sequences, the digital sequences are used to carry the indication information. In case that the terminal receives the indication information, the terminal may obtain the indication information without complex operations such as demodulation, thus improving the reading speed of the indication information at the terminal and saving power consumption of the terminal. In practical operations, a form of the digital sequence used to carry the indication information may be determined according to actual needs and specific application scenarios, which is not limited to a form of bits and ZC sequences listed above.

In embodiments of the present disclosure, after determining each preset moment of sending the non-control channel scheduling data according to the preconfigured period of sending the non-control channel scheduling data, the terminal may send indication information before each preset sending moment arrives, such that the terminal determines whether the non-control channel scheduling data needs to be received at the preset receiving moment according to the indication information received.

In one possible implementation, the base station may send the indication information to the terminal in case that the base station needs to send the non-control channel scheduling data to the terminal at a next preset sending moment and in case that the base station does not need to send the non-control channel scheduling data to the terminal at a next preset sending moment, and use different values to indicate whether there is non-control channel scheduling data to be sent to the terminal at the next preset sending moment.

Specifically, in response to there being the non-control channel scheduling data to be sent to the terminal at the next preset sending moment, the base station may determine that the indication information is first information and is sent to the terminal. In response to there being no non-control channel scheduling data to be sent to the terminal at the next preset sending moment, the base station may determine that the indication information is second information and is sent to the terminal.

The method for transmitting the non-control channel scheduling data based on the indication information provided in embodiments of the present application may determine whether to send the indication information to the terminal before a preset moment of sending the non-control channel scheduling data. The indication information is configured to indicate parameters of the terminal related to reception of the non-control channel scheduling data. Therefore, the base station first sends the indication information to the terminal before sending the scheduling data, so as to indicate whether there is scheduling data to be sent to the terminal at a next moment for the scheduling data, so that the terminal receives the scheduling data only when it is determined that the scheduling data at the next receiving moment is useful, which not only preventing the terminal from obtaining useless scheduling data, but also reduces a frequency of obtaining the scheduling data at the terminal and reduces the power consumption of the terminal.

In one possible implementation of the present disclosure, the base station may send the indication information to the terminal only when there is the non-control channel scheduling data to be sent to the terminal at the next preset sending moment, so as to reduce the frequency of receiving and parsing the indication information at the terminal.

Referring to FIG. 5, yet another method for transmitting non-control channel scheduling data based on indication information provided in an embodiment of the present disclosure is further described below.

FIG. 5 is a flowchart illustrating yet another method for transmitting non-control channel scheduling data based on indication information according to an embodiment of the present disclosure, which is performed by a base station.

As shown in FIG. 5, the method for transmitting the non-control channel scheduling data based on the indication information includes the following steps.

In step 501, the indication information is not sent in response to determining not to send non-control channel scheduling data at a preset moment of sending the non-control channel scheduling data. The indication information is configured to indicate parameters of the terminal related to reception of the non-control channel scheduling data.

In embodiments of the present disclosure, it may be determined whether to send the indication information before each preset moment of sending the non-control channel scheduling data, or it may be determined whether to send the indication information before a predetermined preset moment of sending the non-control channel scheduling data.

It should be noted that the method for transmitting the non-control channel scheduling data based on the indication information in embodiments of the present disclosure may be applied to any terminal. The terminal may be a device that provides voice and/or data connectivity to users. The terminal may be communicated with one or more core networks through a radio access network (RAN). The terminal may be an Internet of Things terminal, such as a sensor device, a mobile phone (or called a "cellular" phone), and a computer with an Internet of Things terminal, such as a fixed device, a portable device, a pocket device, a handheld device, a computer built-in device or a vehicle mounted device. For example, the terminal may be a station (STA), a subscriber unit, a subscriber station, a mobile station, a mobile, a remote station, an access point, a remote terminal, an access terminal, a user terminal, a user agent, a user device, or a user equipment (UE). Alternatively, the terminal may be a device of an unmanned aerial vehicle. Alternatively, the terminal may be a vehicle mounted device, such as a vehicular computer with a wireless communication function or a wireless terminal connected to an external vehicular computer. Alternatively, the terminal may be a roadside device, such as a street light, a signal light, or other roadside devices with wireless communication functions.

It should be noted that in LTE/NR communication services, the introduction of a mechanism for scheduling data on non-control channels avoids demodulation of the PDCCH by the terminal to reduce power consumption of the terminal. Since a service period of the terminal may not match with a period supported by a mechanism for non-control channel scheduling data, the network generally sets a period for the terminal to obtain scheduling data as a relatively small value, so as to reduce transmission delay. However, since not all scheduling data contains useful service data, it is not only easy to obtain useless data that does not contain service data when the period of obtaining scheduling data at the terminal is small, but also power consumption is high, which cannot reduce the power consumption of the terminal.

The parameters related to reception of the non-control channel scheduling data may refer to parameters used to indicate whether the terminal needs to receive the non-control channel scheduling data.

The non-control channel scheduling data may be SPS information, or configured grant scheduling information, etc., which is not limited in embodiments of the present disclosure.

The preset moment of sending the non-control channel scheduling data may be determined according to a preconfigured period of sending the non-control channel scheduling data.

It should be noted that since a basic principle of a mechanism of the non-control channel scheduling data is that the network may configure in advance a period for the base station to send the non-control channel scheduling data, a period for the terminal to receive the non-control channel scheduling data, as well as a size of a data packet, a data transmission format and the like. Therefore, the terminal may determine each preset moment of receiving the non-control channel scheduling data according to the period of receiving non-control channel scheduling data contained in the network configuration information, and the base station may determine each preset moment of sending the non-control channel scheduling data according to the period of sending the non-control channel scheduling data contained in the network configuration information.

In one possible implementation, in response to determining to send the non-control channel scheduling data at the preset moment of sending the non-control channel scheduling data, that is, in case that there is the non-control channel scheduling data to be sent to the terminal at a next preset sending moment, the base station may determine that the indication information needs to be sent to the terminal. In response to determining not to send the non-control channel scheduling data at the preset moment of sending the non-control channel scheduling data, that is, in case that there is no non-control channel scheduling data to be sent to the terminal at a next preset sending moment, the base station may determine that the indication information does not need to be sent to the terminal. Therefore, it is not required to send the indication information to the terminal to reduce the frequency of receiving and parsing the indication information at the terminal, thus further reducing the power consumption of the terminal.

For example, such embodiments may be applied in scenarios with infrequent interaction, where the indication information is sent before the preset sending moment only when it is determined that it is required to send the non-control channel scheduling data to the terminal.

The method for transmitting the non-control channel scheduling data based on the indication information provided in embodiments of the present application may not send the indication information in case that the non-control channel scheduling data is not sent at the preset moment of sending the non-control channel scheduling data. The indication information is configured to indicate parameters of the terminal related to reception of the non-control channel scheduling data. Therefore, the base station may first send the indication information to the terminal before sending the scheduling data to indicate whether there is the scheduling data to be sent to the terminal at a next moment for scheduling data, so that the terminal receives the scheduling data only when it is determined that the scheduling data at the next receiving moment is useful, which not only prevents the terminal from obtaining useless scheduling data, but also reduces the frequency of obtaining scheduling data at the terminal and reduces the power consumption of the terminal.

In one possible implementation of the present disclosure, the base station may send the indication information to the terminal only when there is no non-control channel scheduling data to be sent to the terminal at the next preset sending moment, so as to reduce the frequency of receiving and parsing indication information at the terminal.

Referring to FIG. 6, another method for transmitting non-control channel scheduling data based on indication information provided in an embodiment of the present disclosure is further described below.

FIG. 6 is a flowchart illustrating another method for transmitting non-control channel scheduling data based on indication information according to an embodiment of the present disclosure, which is performed by a base station.

As shown in FIG. 6, the method for transmitting the non-control channel scheduling data based on the indication information includes the following steps.

In step 601, the indication information is not sent to a terminal in response to determining not to send non-control channel scheduling data at a preset moment of sending the non-control channel scheduling data. The indication information is configured to indicate parameters of the terminal related to reception of the non-control channel scheduling data.

In embodiments of the present disclosure, it may be determined whether to sned the indication information before each preset moment of sending the non-control channel scheduling data, or it may be determined whether to send the indication information before a predetermined preset moment of sending the non-control channel scheduling data.

It should be noted that the method for transmitting the non-control channel scheduling data based on the indication information in embodiments of the present disclosure may be applied to any terminal. The terminal may be a device that provides voice and/or data connectivity to users. The terminal may be communicated with one or more core networks through a radio access network (RAN). The terminal may be an Internet of Things terminal, such as a sensor device, a mobile phone (or called a "cellular" phone), and a computer with an Internet of Things terminal, such as a fixed device, a portable device, a pocket device, a handheld device, a computer built-in device or a vehicle mounted device. For example, the terminal may be a station (STA), a subscriber unit, a subscriber station, a mobile station, a mobile, a remote station, an access point, a remote terminal, an access terminal, a user terminal, a user agent, a user device, or a user equipment (UE). Alternatively, the terminal may be a device of an unmanned aerial vehicle. Alternatively, the terminal may be a vehicle mounted device, such as a vehicular computer with a wireless communication function or a wireless terminal connected to an external vehicular computer. Alternatively, the terminal may be a roadside device, such as a street light, a signal light, or other roadside devices with wireless communication functions.

It should be noted that in LTE/NR communication services, the introduction of a mechanism for scheduling data on non-control channels avoids demodulation of the PDCCH by the terminal to reduce power consumption of the terminal. Since a service period of the terminal may not match with a period supported by a mechanism for non-control channel scheduling data, the network generally sets a period for the terminal to obtain scheduling data as a relatively small value, so as to reduce transmission delay. However, since not all scheduling data contains useful service data, it is not only easy to obtain useless data that does not contain service data when the period of obtaining scheduling data at the terminal is small, but also power consumption is high, which cannot reduce the power consumption of the terminal.

The parameters related to reception of the non-control channel scheduling data may refer to parameters used to indicate whether the terminal needs to receive the non-control channel scheduling data.

The non-control channel scheduling data may be SPS information, or configured grant scheduling information, etc., which is not limited in embodiments of the present disclosure.

The preset moment of sending the non-control channel scheduling data may be determined according to a preconfigured period of sending the non-control channel scheduling data.

It should be noted that since a basic principle of a mechanism of the non-control channel scheduling data is that the network may configure in advance a period for the base station to send the non-control channel scheduling data, a period for the terminal to receive the non-control channel scheduling data, as well as a size of a data packet, a data transmission format and the like. Therefore, the terminal may determine each preset moment of receiving the non-control channel scheduling data according to the period of receiving non-control channel scheduling data contained in the network configuration information, and the base station may determine each preset moment of sending the non-control channel scheduling data according to the period of sending the non-control channel scheduling data contained in the network configuration information.

In one possible implementation, in response to determining not to send the non-control channel scheduling data at the preset moment of sending the non-control channel scheduling data, that is, in case that there is no non-control channel scheduling data to be sent to the terminal at the next preset sending moment, the base station may determine that the indication information does not need to be sent to the terminal. In response to determining to send the non-control channel scheduling data at the preset moment of sending the non-control channel scheduling data, that is, in case that there is the non-control channel scheduling data to be sent to the terminal at the next preset sending moment, the base station may determine that the indication information needs to be sent to the terminal. Therefore, there is no need to send the indication information to the terminal to reduce the frequency of receiving and parsing indication information at the terminal, thus further reducing the power consumption of the terminal.

For example, such embodiments may be applied in scenarios with frequent interaction, where the indication information is sent before the preset sending moment only when it is determined that it is not required to send the non-control channel scheduling data to the terminal.

The method for transmitting the non-control channel scheduling data based on the indication information provided in embodiments of the present application may not send the indication information in case that the non-control channel scheduling data is not sent at the preset moment of sending the non-control channel scheduling data. The indication information is configured to indicate parameters of the terminal related to reception of the non-control channel scheduling data. Therefore, the base station may first send the indication information to the terminal before sending the scheduling data to indicate whether there is the scheduling data to be sent to the terminal at a next moment for scheduling data, so that the terminal receives the scheduling data only when it is determined that the scheduling data at the next receiving moment is useful, which not only prevents the terminal from obtaining useless scheduling data, but also reduces the frequency of obtaining scheduling data at the terminal and reduces the power consumption of the terminal.

In one possible implementation of the present disclosure, since certain time periods are required for processes of sending the indication information by the base station and receiving and parsing the indication information by the terminal, a time interval between a moment of sending the indication information and the corresponding preset sending moment may be preset in advance, so that the terminal may obtain the corresponding indication information before the preset receiving moment arrives, thus further improving the reliability of reception of the non-control channel scheduling data.

Referring to FIG. 7, still another method for transmitting non-control channel scheduling data based on indication information provided in an embodiment of the present disclosure is further described below.

FIG. 7 is a flowchart illustrating still another method for transmitting non-control channel scheduling data based on indication information according to an embodiment of the present disclosure, which is performed by a base station.

As shown in FIG. 7, the method for transmitting the non-control channel scheduling data based on the indication information includes the following steps.

In step 701, a time interval between a first moment of sending the indication information and a second moment of sending corresponding non-control channel scheduling data is determined.

The second moment of sending the corresponding non-control channel scheduling data may refer to a preset receiving moment that is after the first moment of sending the indication information and closest to the first moment.

In embodiments of the present disclosure, since certain time periods are required for processes of sending the indication information at the base station and receiving and parsing the indication information at the terminal, a certain time interval is required between the first moment of sending the indication information at the base station and the second moment of sending the corresponding non-control channel scheduling data at the base station, so that the base station may successfully send the indication information before each preset sending moment arrives, and the terminal may effectively read the corresponding indication information before each preset receiving moment arrives, thus reliably determining whether the non-control channel scheduling data needs to be received at the corresponding preset receiving moment.

It should be noted that the time interval between the first moment and the second moment may be configured by network managers according to actual application needs and application scenarios. Therefore, the base station may obtain the time interval between the first moment and the second moment from the network configuration information, and then determine each first moment of sending the indication information according to each preset sending moment the time interval determined between the first moment and the second moment, so as to send the indication information at each first moment.

Furthermore, since factors such as a load capacity of the terminal, a network configuration, and a communication protocol may affect a transmitting speed of the indication information at the network and the base station and a processing speed of the indication information at the terminal, the time interval between the first moment and the second moment may be determined according to the load capacity of the terminal, the network configuration, the communication protocol and the like. In one possible implementation of the present disclosure, the above-mentioned step 701 may include:

determining the time interval between the first moment of receiving the indication information and the second moment of receiving the corresponding non-control channel scheduling data according to at least one of parameters, in which at least one of the parameters is a load capability of the terminal, a network configuration, or a communication protocol.

In some embodiments of the present disclosure, the base station may determine the time interval between the first moment of sending the indication information and the second moment of sending the corresponding non-control channel scheduling data according to at least one of the load capability of the terminal, the network configuration, or the communication protocol.

In one possible implementation, the time interval between the first moment and the second moment may be predetermined in a communication protocol, so the base station may obtain a communication protocol between the base station and the terminal, and obtain the time interval between the first moment and the second moment from the communication protocol.

In another possible implementation, the time interval between the first moment and the second moment may be configured via network, so the base station may obtain the time interval between the first moment and the second moment from the network configuration information.

In still another possible implementation, the load capacity of the terminal may affect a parsing speed of parsing the indication information at the terminal, so the base station may determine the time interval between the first moment and the second moment according to the load capacity of the terminal currently communicated with the base station.

It should be noted that a way for determining the time interval between the first moment and the second moment may include but are not limited to the above-listed situations. In actual applications, the way for determining the time interval may be set according to actual needs and specific service scenarios, which is not limited in embodiments of the present disclosure.

In step 702, before the preset moment of sending the non-control channel scheduling data, it is determined whether to send the indication information to the terminal. The indication information is configured to indicate parameters of the terminal related to reception of the non-control channel scheduling data.

In embodiments of the present disclosure, it is possible to determine whether the indication information is sent before each preset moment of sending the non-control channel scheduling data, and it is also possible to determine whether the indication information is sent before the predetermined preset moment of sending the non-control channel scheduling data.

In some embodiments, determining whether to send the indication information includes:

sending the indication information in response to determining to send the non-control channel scheduling data at the preset moment of sending the non-control channel scheduling data;

or sending the indication information in response to determining not to send the non-control channel scheduling data at the preset moment of sending the non-control channel scheduling data;

or not sending the indication information in response to determining to send the non-control channel scheduling data at the preset moment of sending the non-control channel scheduling data;

or not sending the indication information in response to determining not to send the non-control channel scheduling data at the preset moment of sending the non-control channel scheduling data.

In some embodiments, determining whether to send the indication information includes:

sending the indication information before the preset moment of sending the non-control channel scheduling data, in which the indication information is used to indicate whether to receive the non-control channel scheduling data.

In the above-mentioned embodiments, the indication information may include an indicator or a character field. In case that the indicator or the character field is set as a first value, the indicator or the character field is used to indicate the terminal to receive the non-control channel scheduling data at the preset moment of receiving the non-control channel scheduling data. In case that the indicator or the character field is set as a second value, the indicator or the character field is used to indicate the terminal not to receive the non-control channel scheduling data at the preset moment of receiving the non-control channel scheduling data.

It should be noted that the method for transmitting the non-control channel scheduling data based on the indication information in embodiments of the present disclosure may be applied to any terminal. The terminal may be a device that provides voice and/or data connectivity to users. The terminal may be communicated with one or more core networks through a radio access network (RAN). The terminal may be an Internet of Things terminal, such as a sensor device, a mobile phone (or called a "cellular" phone), and a computer with an Internet of Things terminal, such as a fixed device, a portable device, a pocket device, a handheld device, a computer built-in device or a vehicle mounted device. For example, the terminal may be a station (STA), a subscriber unit, a subscriber station, a mobile station, a mobile, a remote station, an access point, a remote terminal, an access terminal, a user terminal, a user agent, a user device, or a user equipment (UE). Alternatively, the terminal may be a device of an unmanned aerial vehicle. Alternatively, the terminal may be a vehicle mounted device, such as a vehicular computer with a wireless communication function or a wireless terminal connected to an external vehicular computer. Alternatively, the terminal may be a roadside device, such as a street light, a signal light, or other roadside devices with wireless communication functions.

It should be noted that in LTE/NR communication services, the introduction of a mechanism for scheduling data on non-control channels avoids demodulation of the PDCCH by the terminal to reduce power consumption of the terminal. Since a service period of the terminal may not match with a period supported by a mechanism for non-control channel scheduling data, the network generally sets a period for the terminal to obtain scheduling data as a relatively small value, so as to reduce transmission delay. However, since not all scheduling data contains useful service data, it is not only easy to obtain useless data that does not contain service data when the period of obtaining scheduling data at the terminal is small, but also power consumption is high, which cannot reduce the power consumption of the terminal.

The non-control channel scheduling data may be SPS information, or configured grant scheduling information, etc., which is not limited in embodiments of the present disclosure.

The parameters related to reception of the non-control channel scheduling data may refer to parameters used to indicate whether the terminal needs to receive the non-control channel scheduling data.

The preset moment of sending the non-control channel scheduling data may be determined according to a preconfigured period of sending the non-control channel scheduling data.

It should be noted that since a basic principle of a mechanism of the non-control channel scheduling data is that the network may configure in advance a period for the base station to send the non-control channel scheduling data, a period for the terminal to receive the non-control channel scheduling data, as well as a size of a data packet, a data transmission format and the like. Therefore, the terminal may determine each preset moment of receiving the non-control channel scheduling data according to the period of receiving non-control channel scheduling data contained in the network configuration information, and the base station may determine each preset moment of sending the non-control channel scheduling data according to the period of sending the non-control channel scheduling data contained in the network configuration information.

The indication information may include at least one of first information for instructing the terminal to receive the non-control channel scheduling data, or second information for instructing the terminal not to receive the non-control channel scheduling data.

In one possible implementation, in case that the terminal needs to receive the non-control channel scheduling data and in case that the terminal does not need to receive the non-control channel scheduling data, the base station may send the indication information to the terminal, and use different values to indicate whether the terminal receives the non-control channel scheduling data at the preset receiving moment. Therefore, the indication information may include the first information for instructing the terminal to receive the non-control channel scheduling data, and the second information for instructing the terminal not to receive the non-control channel scheduling data. The first information is different from the second information.

In another possible implementation, the base station may send the indication information to the terminal only when the terminal needs to receive the non-control channel scheduling data. Therefore, in this case, the indication information may only include the first information used to instruct the terminal to receive the non-control channel scheduling data. In case that the terminal does not need to receive control channel scheduling data, the terminal cannot obtain the indication information.

In embodiments of the present disclosure, the indication information is carried by a digital sequence.

Alternatively, in case that the indication information includes the first information and the second information, different digital sequences may be used to represent the first information and the second information. For example, the first information is 1, and the second information is 0. Alternatively, ZC sequences may be used to represent the indication information. For example, the first information is ZC sequence 1, and the second information is ZC sequence 2.

Alternatively, in case that the indication information only includes the first information, a digital sequence may be used to represent the first information. For example, the first information is 1. Alternatively, a ZC sequence may be used to represent the first information. For example, the first information is ZC sequence 1.

It should be noted that due to low self-correlation and cross-correlation of the digital sequences, the digital sequences are used to carry the indication information. In case that the terminal receives the indication information, the terminal may obtain the indication information without complex operations such as demodulation, thus improving the reading speed of the indication information at the terminal and saving power consumption of the terminal. In practical operations, a form of the digital sequence used to carry the indication information may be determined according to actual needs and specific application scenarios, which is not limited to a form of bits and ZC sequences listed above.

In embodiments of the present disclosure, after determining each preset moment of sending the non-control channel scheduling data and the time interval between the first moment and the second time according to the preconfigured period of sending the non-control channel scheduling data, the base station may determine, as each first moment, a moment before each preset sending moment whose difference with each preset sending moment is the time interval, send the indication information at each first moment to the terminal, such that the terminal determines whether the non-control channel scheduling data needs to be received at the preset receiving moment according to the indication information received.

In one possible implementation, the base station may send the indication information to the terminal when there is non-control channel scheduling data that needs to be sent to the terminal at the next preset sending moment, and when there is non-control channel scheduling data that does not need to be sent to the terminal at the next preset sending moment, and use different values to indicate whether there is the non-control channel scheduling data to be sent to the terminal at the next preset sending moment.

Specifically, in response to there being the non-control channel scheduling data to be sent to the terminal at the next preset sending moment, the base station may determine that the indication information is first information and send the first information to the terminal. In response to there being no non-control channel scheduling data to be sent to the terminal at the next preset sending moment, the base station may determine that the indication information is second information and send the second information to the terminal.

The method for transmitting the non-control channel scheduling data based on the indication information provided in embodiments of the present application may determine the time interval between the first moment of sending the indication information and the second moment of sending corresponding non-control channel scheduling data before sending the indication information, and determine whether to send the indication information to the terminal before each preset moment of sending the non-control channel scheduling data according to the time interval. The indication information is configured to indicate parameters of the terminal related to reception of the non-control channel scheduling data. Therefore, by presetting the time interval between the moment of sending the indication information and the corresponding preset sending moment in advance, and first sending the indication information to the terminal to indicate whether there is scheduling data to be sent to the terminal at a next moment for scheduling data before sending the scheduling data, the terminal receives the scheduling data only when it is determined that the scheduling data at the next receiving moment is useful, which not only prevents the terminal from obtaining useless scheduling data, but also reduces the power consumption of the terminal and enables the terminal to effectively read the corresponding indication information before the preset receiving moment arrives, thus further improving the reliability of receiving the non-control channel scheduling data.

In one possible implementation of the present disclosure, since detecting indication information consumes the power of the terminal, it is possible to use the indication information to determine whether the non-control channel scheduling data information needs to be received in case that the empty detection probability of scheduling data is high based on actual situations, so as to further reduce the power consumption of the terminal.

Referring to FIG. 8, yet another method for transmitting non-control channel scheduling data based on indication information provided in an embodiment of the present disclosure is further described below.

FIG. 8 is a flowchart illustrating yet another method for transmitting non-control channel scheduling data based on indication information according to an embodiment of the present disclosure, which is performed by a base station.

As shown in FIG. 8, the method for transmitting the non-control channel scheduling data based on the indication information includes the following steps.

In step 801, an indication information acquiring request is received by a terminal.

In embodiments of the present disclosure, the higher current empty detection probability of the terminal indicates that a proportion that cannot receive useful non-control channel scheduling data is relatively large when the terminal receives the non-control channel scheduling data at a predetermined data reception period, thus increasing unnecessary power consumption of the terminal. Therefore, when the empty detection probability is relatively high, it is possible to determine whether the non-control channel scheduling data needs to be obtained at each preset receiving moment through the indication information.

In one possible implementation, in case that the terminal determines that the current empty detection probability is greater than a first threshold, the terminal may determine that the current empty detection probability of the terminal is relatively high, so that the terminal may send the indication information acquiring request to the base station. The base station may obtain the indication information acquiring request sent by the base station in real time, and determine whether to send the indication information to the terminal based on a strategy of the base station in case of obtaining the indication information acquiring request.

In step 802, an activation instruction is sent to a terminal. The activation instruction is configured to instruct the terminal to activate a function of receiving the indication information.

In embodiments of the present disclosure, after the base station obtains the indication information acquiring request send by the base station, the activation instruction may be sent to the base station to activate a function of receiving the indication information, so that the base station first obtain the indication information before receiving the non-control channel scheduling data in the future, so as to determine whether the non-control channel scheduling data needs to be received at a next preset receiving moment according the indication information.

Alternatively, the base station may configure the activation instruction from a high-level signaling issued by the base station, or configure the activation instruction from a dynamic signaling issued by the base station.

In step 803, it is determined whether to send the indication information to the terminal before the preset moment of sending the non-control channel scheduling data. The indication information is configured to indicate parameters of a terminal related to reception of the non-control channel scheduling data.

In embodiments of the present disclosure, the base station may determine whether to send the indication information before each preset moment of sending the non-control channel scheduling data, and it is also possible to determine whether to send the indication information before a predetermined preset moment of sending the non-control channel scheduling data.

In some embodiments, determining whether to send the indication information includes:

sending the indication information in response to determining to send the non-control channel scheduling data at the preset moment of sending the non-control channel scheduling data;

or sending the indication information in response to determining not to send the non-control channel scheduling data at the preset moment of sending the non-control channel scheduling data;

or not sending the indication information in response to determining to send the non-control channel scheduling data at the preset moment of sending the non-control channel scheduling data;

or not sending the indication information in response to determining not to send the non-control channel scheduling data at the preset moment of sending the non-control channel scheduling data.

In some embodiments, determining whether to send the indication information includes:

sending the indication information before the preset moment of sending the non-control channel scheduling data, in which the indication information is used to indicate whether to receive the non-control channel scheduling data.

In the above-mentioned embodiments, the indication information may include an indicator or a character field. In case that the indicator or the character field is set as a first value, the indicator or the character field is used to indicate the terminal to receive the non-control channel scheduling data at the preset moment of receiving the non-control channel scheduling data. In case that the indicator or the character field is set as a second value, the indicator or the character field is used to indicate the terminal not to receive the non-control channel scheduling data at the preset moment of receiving the non-control channel scheduling data.

It should be noted that the method for transmitting the non-control channel scheduling data based on the indication information in embodiments of the present disclosure may be applied to any terminal. The terminal may be a device that provides voice and/or data connectivity to users. The terminal may be communicated with one or more core networks through a radio access network (RAN). The terminal may be an Internet of Things terminal, such as a sensor device, a mobile phone (or called "cellular" phone), and a computer with an Internet of Things terminal, such as a fixed device, a portable device, a pocket device, a handheld device, a computer built-in device or a vehicle mounted device. For example, the terminal may be a station (STA), a subscriber unit, a subscriber station, a mobile station, a mobile, a remote station, an access point, a remote terminal, an access terminal, a user terminal, a user agent, a user device, or a user equipment (UE). Alternatively, the terminal may be a device of an unmanned aerial vehicle. Alternatively, the terminal may be a vehicle mounted device, such as a vehicular computer with a wireless communication function or a wireless terminal connected to an external vehicular computer. Alternatively, the terminal may be a roadside device, such as a street light, a signal light, or other roadside devices with wireless communication functions.

It should be noted that in LTE/NR communication services, the introduction of a mechanism for scheduling data on non-control channels avoids demodulation of the PDCCH by the terminal to reduce power consumption of the terminal. Since a service period of the terminal may not match with a period supported by a mechanism for non-control channel scheduling data, the network generally sets a period for the terminal to obtain scheduling data as a relatively small value, so as to reduce transmission delay. However, since not all scheduling data contains useful service data, it is not only easy to obtain useless data that does not contain service data when the period of obtaining scheduling data at the terminal is small, but also power consumption is high, which cannot reduce the power consumption of the terminal.

The parameters related to reception of the non-control channel scheduling data may refer to parameters used to indicate whether the terminal needs to receive the non-control channel scheduling data.

The non-control channel scheduling data may be SPS information, or configured grant scheduling information, etc., which is not limited in embodiments of the present disclosure.

The preset moment of sending the non-control channel scheduling data may be determined according to a preconfigured period of sending the non-control channel scheduling data.

It should be noted that since a basic principle of a mechanism of the non-control channel scheduling data is that the network may configure in advance a period for the base station to send the non-control channel scheduling data, a period for the terminal to receive the non-control channel scheduling data, as well as a size of a data packet, a data transmission format and the like. Therefore, the terminal may determine each preset moment of receiving the non-control channel scheduling data according to the period of receiving non-control channel scheduling data contained in the network configuration information, and the base station may determine each preset moment of sending the non-control channel scheduling data according to the period of sending the non-control channel scheduling data contained in the network configuration information.

The indication information may include at least one of first information for instructing the terminal to receive the non-control channel scheduling data, or second information for instructing the terminal not to receive the non-control channel scheduling data.

In one possible implementation, in case that the terminal needs to receive the non-control channel scheduling data and in case that the terminal does not need to receive the non-control channel scheduling data, the base station may send the indication information to the terminal, and use different values to indicate whether the terminal receives the non-control channel scheduling data at the preset receiving moment. Therefore, the indication information may include the first information for instructing the terminal to receive the non-control channel scheduling data, and the second information for instructing the terminal not to receive the non-control channel scheduling data. The first information is different from the second information.

In another possible implementation, the base station may send the indication information to the terminal only when the terminal needs to receive the non-control channel scheduling data. Therefore, in this case, the indication information may only include the first information used to instruct the terminal to receive the non-control channel scheduling data. In case that the terminal does not need to receive control channel scheduling data, the terminal cannot obtain the indication information.

In embodiments of the present disclosure, the indication information is carried by a digital sequence.

Alternatively, in case that the indication information includes the first information and the second information, different digital sequences may be used to represent the first information and the second information. For example, the first information is 1, and the second information is 0. Alternatively, ZC sequences may be used to represent the indication information. For example, the first information is ZC sequence 1, and the second information is ZC sequence 2.

Alternatively, in case that the indication information only includes the first information, a digital sequence may be used to represent the first information. For example, the first information is 1. Alternatively, a ZC sequence may be used to represent the first information. For example, the first information is ZC sequence 1.

It should be noted that due to low self-correlation and cross-correlation of the digital sequences, the digital sequences are used to carry the indication information. In case that the terminal receives the indication information, the terminal may obtain the indication information without complex operations such as demodulation, thus improving the reading speed of the indication information at the terminal and saving power consumption of the terminal. In practical operations, a form of the digital sequence used to carry the indication information may be determined according to actual needs and specific application scenarios, which is not limited to a form of bits and ZC sequences listed above.

In embodiments of the present disclosure, after determining each preset moment of sending the non-control channel scheduling data according to a preconfigured period of sending the non-control channel scheduling data, the base station may send the indication information to the terminal before each preset sending moment arrives, so that the terminal may determine whether the non-control channel scheduling data is received at the preset receiving moment based on the indication information received.

In one possible implementation, the base station may send the indication information to the terminal in case that there is non-control channel scheduling data that needs to be sent to the terminal at the next preset sending moment, and in case that there is no non-control channel scheduling data that needs to be sent to the terminal at the next preset sending moment, and use different values to indicate whether there is non-control channel scheduling data to be sent to the terminal at the next preset sending moment.

Specifically, in response to there being non-control channel scheduling data to be sent to the terminal at the next preset sending moment, the base station may determine that the indication information is first information and send the first information to the terminal. In response to there being no non-control channel scheduling data to be sent to the terminal at the next preset sending moment, the base station may determine that the indication information is second information and send the second information to the terminal.

The method for transmitting the non-control channel scheduling data based on the indication information provided in embodiments of the present application may send the activation instruction to the terminal in case of receiving the indication information acquiring request sent by the terminal to enable the terminal to activate the function of receiving the indication information, and then determine whether to send the indication information to the terminal before the preset moment of sending the non-control channel scheduling data. The indication information is configured to indicate parameters of the terminal related to reception of the non-control channel scheduling data. Therefore, the base station triggers the terminal to activate the function of receiving the indication information when needed by the terminal to reduce the power consumption of the terminal to receive and parse the indication information. Before sending the scheduling data, the base station first sends the indication information to the terminal to indicate whether there is scheduling data to be sent to the terminal at the next moment for scheduling data, so that the terminal receives the scheduling data only when it is determined that the scheduling data at the next receiving time is useful, thus not only preventing the terminal from obtaining useless scheduling data, reducing the frequency of acquiring scheduling data at the terminal, but also further reducing the power consumption of the terminal.

In one embodiment of the present disclosure, it is also possible to determine the empty detection probability of the scheduling data of the terminal through the base station, so that in case that the empty detection probability is high, it may actively send the activation instruction received in the indication information to the terminal, so as to further reduce the power consumption of the terminal.

Figure 9:
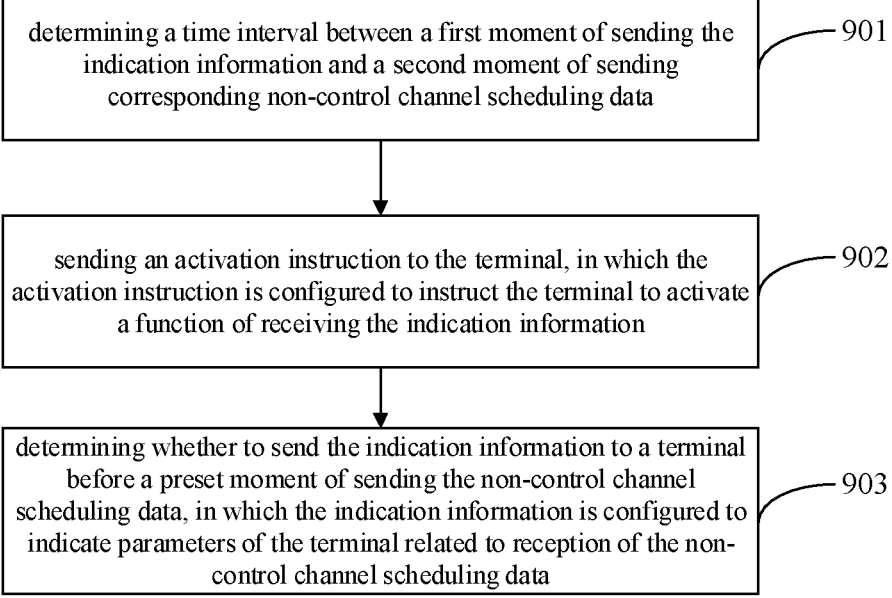
FIG. 9 is a flowchart illustrating yet another method for transmitting non-control channel scheduling data based on indication information according to an embodiment of the present disclosure.

Referring to FIG. 9, yet another method for transmitting non-control channel scheduling data based on indication information provided in an embodiment of the present disclosure is further described below.

FIG. 9 is a flowchart illustrating yet another method for transmitting non-control channel scheduling data based on indication information according to an embodiment of the present disclosure, which is performed by a base station.

As shown in FIG. 9, the method for transmitting the non-control channel scheduling data based on the indication information includes the following steps.

In step 901, it is determined that the current empty detection probability of the terminal is greater than a first threshold.

It should be noted that the current empty detection probability of the non-control channel scheduling data of the terminal may be determined by the base station. In case that the base station determines that the empty detection probability is greater than the first threshold, the base station may actively send the activation instruction to the terminal, such that the terminal activates the function of receiving the indication information, thus saving the power consumption for detecting the empty detection probability at the terminal and further reducing the power consumption of the terminal.

The empty detection probability may be determined according to the number of times the terminal receives the non-control channel scheduling data within a certain period of time, and the number of pieces of the non-control channel scheduling data received. Alternatively, assuming that the number of pieces of the non-control channel scheduling data received by the terminal within a certain current period of time is a, and the number of times the non-control channel scheduling data is received is b, 1−a/b may be determined as the current empty detection probability of non-control channel scheduling data of the terminal. It should be noted that the empty detection probability may reflect a proportion for which the terminal does not receive useful non-control channel scheduling data at the preset receiving moment.

In embodiments of the present disclosure, since the empty detection probability of the non-control channel scheduling data of the terminal may vary in real time, a frequency of determining the empty detection probability may be preset, allowing the terminal to determine a moment to calculate the empty detection probability according to the preset frequency, and calculate a current time period at which the moment of receiving the non-control channel scheduling data for calculating the empty detection probability falls within, so that the terminal may determine a real-time empty detection probability of the terminal during each time period in time.

For example, the preset frequency of determining the empty detection probability is 1 hour/times. The last moment to determine the empty detection probability is 10:00, and the current moment is 11:00. Therefore, the current time period may be determined to be 10:00 to 11:00, and the terminal may calculate the current empty detection probability at 11:00. Assuming that the number of times the terminal receives the non-control channel scheduling data is N, and the number of pieces of non-control channel scheduling data received by the terminal is M during the current period of 10:00 to 11:00, it may be determined that the empty detection probability of the terminal during the current period of 10:00 to 11:00 is 1-N/M.

It should be noted that the above-mentioned examples are only illustrative and cannot be considered as limiting the present disclosure. In actual applications, the frequency of determining the empty detection probability may be set according to actual needs and specific service scenarios, such as 1 hour/times, 2 hours/times, 24 hours/times, etc., which is not limited in embodiments of the present disclosure.

In embodiments of the present disclosure, the higher current empty detection probability of the terminal indicates that a proportion that cannot receive useful non-control channel scheduling data is relatively large when the terminal receives the non-control channel scheduling data at a predetermined data reception period, thus increasing unnecessary power consumption of the terminal. Therefore, when the empty detection probability is relatively high, it is possible to determine whether the non-control channel scheduling data needs to be obtained at each preset receiving moment through the indication information.

In one possible implementation, the base station may determine that the current empty detection probability of the terminal is relatively high in case that the base station determines that the current empty detection probability is greater than the first threshold. That is, the base station determines whether the terminal needs to receive the non-control channel scheduling data at the preset receiving moment through the indication information, which prevents the terminal from detecting the non-control channel scheduling data in case that the terminal does not send the non-control channel scheduling data, so as to the reduce power consumption of the terminal.

In step 902, the activation instruction is sent to the terminal. The activation instruction is configured to instruct the terminal to start a function of receiving the indication information.

In embodiments of the present disclosure, after the base station determines that the current empty detection probability of the terminal is greater than the first threshold, the activation instruction may be sent to the base station to activate a function of receiving the indication information, so that the base station first obtains the indication information before receiving the non-control channel scheduling data in the future, so as to determine whether the non-control channel scheduling data needs to be received at a next preset receiving moment according to the indication information.

Alternatively, the base station may configure the activation instruction from a high-level signaling issued, or configure the activation instruction from a dynamic signaling issued.

In step 903, it is determined whether the indication information is sent to the terminal before the preset moment of sending the non-control channel scheduling data. The indication information is configured to indicate parameters of a terminal related to reception of the non-control channel scheduling data.

In embodiments of the present disclosure, the base station may determine whether to send the indication information before each preset moment of sending the non-control channel scheduling data, and it is also possible to determine whether to send the indication information before the predetermined preset moment of sending the non-control channel scheduling data.

In some embodiments, determining whether to send the indication information includes:

sending the indication information in response to determining to send the non-control channel scheduling data at the preset moment of sending the non-control channel scheduling data;

or sending the indication information in response to determining not to send the non-control channel scheduling data at the preset moment of sending the non-control channel scheduling data;

or not sending the indication information in response to determining to send the non-control channel scheduling data at the preset moment of sending the non-control channel scheduling data;

or not sending the indication information in response to determining to not send the non-control channel scheduling data at the preset moment of sending the non-control channel scheduling data.

In some embodiments, determining whether to send the indication information includes:

sending the indication information before the preset moment of sending the non-control channel scheduling data, in which the indication information is used to indicate whether the terminal receives the non-control channel scheduling data.

In the above-mentioned embodiments, the indication information may include an indicator or a character field. In case that the indicator or the character field is set as a first value, the indicator or the character field is used to indicate the terminal to receive the non-control channel scheduling data at the preset moment of receiving the non-control channel scheduling data. In case that the indicator or the character field is set as a second value, the indicator or the character field is used to indicate the terminal not to receive the non-control channel scheduling data at the preset moment of receiving the non-control channel scheduling data.

It should be noted that the method for transmitting the non-control channel scheduling data based on the indication information in embodiments of the present disclosure may be applied to any terminal. The terminal may be a device that provides voice and/or data connectivity to users. The terminal may be communicated with one or more core networks through a radio access network (RAN). The terminal may be an Internet of Things terminal, such as a sensor device, a mobile phone (or called a "cellular" phone), and a computer with an Internet of Things terminal, such as a fixed device, a portable device, a pocket device, a handheld device, a computer built-in device or a vehicle mounted device. For example, the terminal may be a station (STA), a subscriber unit, a subscriber station, a mobile station, a mobile, a remote station, an access point, a remote terminal, an access terminal, a user terminal, a user agent, a user device, or a user equipment (UE). Alternatively, the terminal may be a device of an unmanned aerial vehicle. Alternatively, the terminal may be a vehicle mounted device, such as a vehicular computer with a wireless communication function or a wireless terminal connected to an external vehicular computer. Alternatively, the terminal may be a roadside device, such as a street light, a signal light, or other roadside devices with wireless communication functions.

It should be noted that in LTE/NR communication services, the introduction of a mechanism for scheduling data on non-control channels avoids demodulation of the PDCCH by the terminal to reduce power consumption of the terminal. Since a service period of the terminal may not match with a period supported by a mechanism for non-control channel scheduling data, the network generally sets a period for the terminal to obtain scheduling data as a relatively small value, so as to reduce transmission delay. However, since not all scheduling data contains useful service data, it is not only easy to obtain useless data that does not contain service data when the period of obtaining scheduling data at the terminal is small, but also power consumption is high, which cannot reduce the power consumption of the terminal.

The parameters related to reception of the non-control channel scheduling data may refer to parameters used to indicate whether the terminal needs to receive the non-control channel scheduling data.

The non-control channel scheduling data may be SPS information, or configured grant scheduling information, etc., which is not limited in embodiments of the present disclosure.

The preset moment of sending the non-control channel scheduling data may be determined according to a preconfigured period of sending the non-control channel scheduling data.

It should be noted that since a basic principle of a mechanism of the non-control channel scheduling data is that the network may configure in advance a period for the base station to send the non-control channel scheduling data, a period for the terminal to receive the non-control channel scheduling data, as well as a size of a data packet, a data transmission format and the like. Therefore, the terminal may determine each preset moment of receiving the non-control channel scheduling data according to the period of receiving non-control channel scheduling data contained in the network configuration information, and the base station may determine each preset moment of sending the non-control channel scheduling data according to the period of sending the non-control channel scheduling data contained in the network configuration information.

The indication information may include at least one of first information for instructing the terminal to receive the non-control channel scheduling data, or second information for instructing the terminal not to receive the non-control channel scheduling data.

In one possible implementation, in case that the terminal needs to receive the non-control channel scheduling data and in case that the terminal does not need to receive the non-control channel scheduling data, the base station may send the indication information to the terminal, and use different values to indicate whether the terminal receives the non-control channel scheduling data at the preset receiving moment. Therefore, the indication information may include the first information for instructing the terminal to receive the non-control channel scheduling data, and the second information for instructing the terminal not to receive the non-control channel scheduling data. The first information is different from the second information.

In another possible implementation, the base station may send the indication information to the terminal only when the terminal needs to receive the non-control channel scheduling data. Therefore, in this case, the indication information may only include the first information used to instruct the terminal to receive the non-control channel scheduling data. In case that the terminal does not need to receive control channel scheduling data, the terminal cannot obtain the indication information.

In embodiments of the present disclosure, the indication information is carried by a digital sequence.

Alternatively, in case that the indication information includes the first information and the second information, different digital sequences may be used to represent the first information and the second information. For example, the first information is 1, and the second information is 0. Alternatively, ZC sequences may be used to represent the indication information. For example, the first information is ZC sequence 1, and the second information is ZC sequence 2.

Alternatively, in case that the indication information only includes the first information, a digital sequence may be used to represent the first information. For example, the first information is 1. Alternatively, a ZC sequence may be used to represent the first information. For example, the first information is ZC sequence 1.

It should be noted that due to low self-correlation and cross-correlation of the digital sequences, the digital sequences are used to carry the indication information. In case that the terminal receives the indication information, the terminal may obtain the indication information without complex operations such as demodulation, thus improving the reading speed of the indication information at the terminal and saving power consumption of the terminal. In practical operations, a form of the digital sequence used to carry the indication information may be determined according to actual needs and specific application scenarios, which is not limited to a form of bits and ZC sequences listed above.

In embodiments of the present disclosure, after determining each preset moment of sending the non-control channel scheduling data according to a preconfigured period of sending the non-control channel scheduling data, the base station may send the indication information to the terminal before each preset sending moment arrives, so that the terminal may determine whether the non-control channel scheduling data is received at the preset receiving moment based on the indication information received.

In one possible implementation, the base station may send the indication information to the terminal in case that there is non-control channel scheduling data that needs to be sent to the terminal at the next preset sending moment, and in case that there is no non-control channel scheduling data that needs to be sent to the terminal at the next preset sending moment, and use different values to indicate whether there is non-control channel scheduling data to be sent to the terminal at the next preset sending moment.

Specifically, in response to there being non-control channel scheduling data to be sent to the terminal at the next preset sending moment, the base station may determine that the indication information is first information and send the first information to the terminal. In response to there being no non-control channel scheduling data to be sent to the terminal at the next preset sending moment, the base station may determine that the indication information is second information and send the second information to the terminal.

The method for transmitting the non-control channel scheduling data based on the indication information provided in embodiments of the present application may actively send the activation instruction to the terminal in case that the current empty detection probability of the non-control channel scheduling data of the terminal is relatively large, so that the terminal activates the function of receiving the indication information, and it is determined whether to send the indication information to the terminal before the preset moment of sending the non-control channel scheduling data. The indication information is configured to indicate parameters of the terminal related to reception of the non-control channel scheduling data. Therefore, the base station actively triggers the terminal to activate the function of receiving indication information when needed by the terminal, in order to reduce the power consumption of the terminal in receiving and parsing indication information, and the power consumption of detecting the empty detection probability of the scheduling data. Before sending scheduling data, the base station first sends the indication information to the terminal to indicate whether there is scheduling data to be sent to the terminal at a next moment for scheduling data, so that the terminal receives the scheduling data only when it is determined that the scheduling data at the next receiving moment is useful, which not only prevents the terminal from obtaining useless scheduling data, reduces the frequency of obtaining scheduling data at the terminal, but also further reduces the power consumption of the terminal.

In order to implement the above-mentioned embodiments, the present disclosure also provides an apparatus for transmitting non-control channel scheduling data based on indication information.

Figure 10:
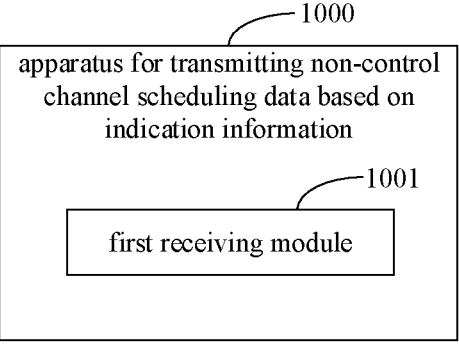
FIG. 10 is a schematic diagram illustrating an apparatus for transmitting non-control channel scheduling data based on indication information according to an embodiment of the present disclosure.

FIG. 10 is a schematic diagram illustrating an apparatus for transmitting non-control channel scheduling data based on indication information according to an embodiment of the present disclosure, which is performed by a terminal.

As shown in FIG. 10, the apparatus 1000 for transmitting the non-control channel scheduling data based on the indication information includes:

a first receiving module 1001 configured to determine whether the indication information is received before a preset moment of receiving the non-control channel scheduling data; in which the indication information is configured to indicate parameters of a terminal related to reception of the non-control channel scheduling data.

In practical applications, the apparatus for transmitting the non-control channel scheduling data based on the indication information provided in embodiments of the present disclosure may be configured in any terminal to execute the above-mentioned method for transmitting the non-control channel scheduling data based on the indication information.

The apparatus for transmitting the non-control channel scheduling data based on the indication information provided in embodiments of the present application may determine whether the indication information is received before the preset moment of receiving the non-control channel scheduling data. The indication information is configured to indicate parameters of the terminal related to reception of the non-control channel scheduling data. Therefore, before receiving the scheduling data, the terminal first determines whether the scheduling data needs to be received at a next receiving moment based on the indicating information, so that the terminal receives the scheduling data only when it is determined that the scheduling data at the next receiving moment is useful, which not only prevents the terminal from obtaining useless scheduling data, but also reduces the frequency of obtaining scheduling data at the terminal and reduces the power consumption of the terminal.

In one possible implementation of the present disclosure, the indication information includes at least one of first information for instructing the terminal to receive the non-control channel scheduling data, or second information for instructing the terminal not to receive the non-control channel scheduling data.

Furthermore, in another possible implementation of the present disclosure, the indication information is carried by a digital sequence.

Furthermore, in yet another possible implementation of the present disclosure, the apparatus 1000 for transmitting the non-control channel scheduling data based on the indication information further includes:

a first determining module configured to determine a time interval between a first moment of receiving the indication information and a second moment of receiving corresponding non-control channel scheduling data.

Furthermore, in still another possible implementation of the present disclosure, the first determining module includes:

a first determining unit configured to determine the time interval between the first moment of receiving the indication information and the second moment of receiving the corresponding non-control channel scheduling data according to at least one of parameters, in which at least one of the parameters is a load capability of the terminal, a network configuration, or a communication protocol.

Furthermore, in still another possible implementation of the present disclosure, the apparatus 1000 for transmitting the non-control channel scheduling data based on the indication information further includes:

a second receiving module configured to receive an activation instruction sent by a base station, in which the activation instruction is configured to instruct the terminal to activate a function of receiving the indication information.

Furthermore, in another possible implementation of the present disclosure, the apparatus 1000 for transmitting the non-control channel scheduling data based on the indication information further includes:

a second determining module configured to determine a current empty detection probability of non-control channel scheduling data of the terminal; and a second sending module configured to send an indication information acquiring request to a base station in case that the empty detection probability is greater than a first threshold.

Furthermore, in yet another possible implementation of the present disclosure, the non-control channel scheduling data is semi-persistent scheduling (SPS) information.

Furthermore, in still another possible implementation of the present disclosure, the apparatus 1000 for transmitting the non-control channel scheduling data based on the indication information further includes:

a third determining module configured to determine to receive the non-control channel scheduling data at the preset moment of receiving the non-control channel scheduling data in response to receiving the indication information;

or a fourth determining module configured to determine not to receive the non-control channel scheduling data at the preset moment of receiving the non-control channel scheduling data in response to receiving the indication information;

or a fifth determining module configured to determine to receive the non-control channel scheduling data at the preset moment of receiving the non-control channel scheduling data in response to not receiving the indication information;

or a sixth determining module configured to determining not to receive the non-control channel scheduling data at the preset moment of receiving the non-control channel scheduling data in response to not receiving the indication information.

It should be noted that explanations of embodiments of the methods for transmitting the non-control channel scheduling data based on the indication information shown in FIG. 1, FIG. 2, and FIG. 3 are also applicable to the apparatus 1000 for transmitting the non-control channel scheduling data based on the indication information, and will not be repeated here.

The apparatus for transmitting the non-control channel scheduling data based on the indication information provided in embodiments of the present application may determine the time interval between the first moment of receiving the indication information and the second moment of receiving corresponding non-control channel scheduling data before receiving the indication information, and determine whether the indication information is received before the preset moment of receiving the non-control channel scheduling data according to the time interval. The indication information is configured to indicate parameters of the terminal related to reception of the non-control channel scheduling data. Therefore, by presetting the time interval between the moment of receiving the indication information and the corresponding preset moment for receiving the scheduling data in advance, and first determining whether the scheduling data needs to be received at the next moment of receiving the scheduling data through the indication information before receiving the scheduling data, the terminal receives the scheduling data only when it is determined that the scheduling data at the next receiving moment is useful, which not only prevents the terminal from obtaining useless scheduling data, but also reduces the power consumption of the terminal and enables the terminal to effectively read the corresponding indication information before the preset receiving moment arrives, thus further improving the reliability of receiving the non-control channel scheduling data.

In order to implement the above-mentioned embodiments, the present disclosure also provides an apparatus for transmitting non-control channel scheduling data based on indication information.

Figure 11:
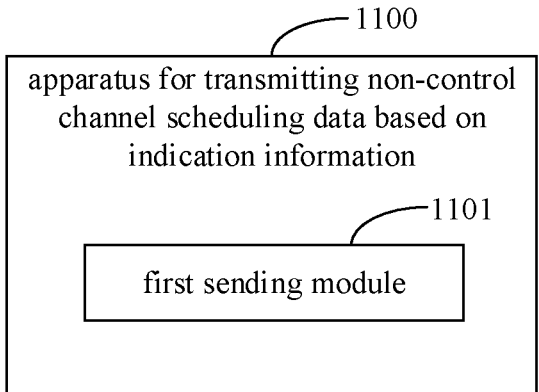
FIG. 11 is a schematic diagram illustrating an apparatus for transmitting non-control channel scheduling data based on indication information according to another embodiment of the present disclosure.

FIG. 11 is a schematic diagram illustrating another apparatus for transmitting non-control channel scheduling data based on indication information according to an embodiment of the present disclosure, which is performed by a base station.

As shown in FIG. 11, the apparatus 1100 for transmitting the non-control channel scheduling data based on the indication information includes:

a first sending module 1101 configured to determine whether to send the indication information to a terminal before a preset moment of sending the non-control channel scheduling data, in which the indication information is configured to indicate parameters of a terminal related to reception of the non-control channel scheduling data.

In practical applications, the apparatus for transmitting the non-control channel scheduling data based on the indication information provided in embodiments of the present disclosure may be configured in any terminal to execute the above-mentioned method for transmitting the non-control channel scheduling data based on the indication information.

The apparatus for transmitting the non-control channel scheduling data based on the indication information provided in embodiments of the present application may determine whether to send the indication information to the terminal before the preset moment of sending the non-control channel scheduling data. The indication information is configured to indicate parameters of the terminal related to reception of the non-control channel scheduling data. Therefore, before sending the scheduling data, the base station first sends the indicating information to the terminal to indicate whether there is scheduling data to be sent to the terminal at the next moment for scheduling data, so that the terminal may receive the scheduling data only when it is determined that the scheduling data at the next receiving moment is useful, which not only prevents the terminal from obtaining useless scheduling data, but also reduces the frequency of obtaining scheduling data at the terminal and reduces the power consumption of the terminal.

In one possible implementation of the present disclosure, the indication information includes at least one of: first information for instructing the terminal to receive the non-control channel scheduling data, or second information for instructing the terminal not to receive the non-control channel scheduling data.

Furthermore, in another possible implementation of the present disclosure, the indication information is carried by a digital sequence.

Furthermore, in yet another possible implementation of the present disclosure, the apparatus 1100 for transmitting the non-control channel scheduling data based on the indication information further includes:

a seventh determining module configured to determine a time interval between a first moment of sending the indication information and a second moment of sending corresponding non-control channel scheduling data.

Furthermore, in still another possible implementation of the present disclosure, the seventh determining module includes:

a second determining unit configured to determining the time interval between the first moment of receiving the indication information and the second moment of receiving the corresponding non-control channel scheduling data according to at least one of parameters, wherein at least one of the parameters is a load capability of the terminal, a network configuration, or a communication protocol.

Furthermore, in still another possible implementation of the present disclosure, the apparatus 1100 for transmitting the non-control channel scheduling data based on the indication information further includes:

a third sending module configured to send an activation instruction to the terminal, in which the activation instruction is configured to instruct the terminal to activate a function of receiving the indication information.

Furthermore, in another possible implementation of the present disclosure, the apparatus 1100 for transmitting the non-control channel scheduling data based on the indication information further includes:

an eighth determining module configured to determine that a current empty detection probability of non-control channel scheduling data of the terminal is greater than a first threshold.

Furthermore, in yet another possible implementation of the present disclosure, the apparatus 1100 for transmitting the non-control channel scheduling data based on the indication information further includes:

a third receiving module configured to receive an indication information acquiring request sent by the terminal.

Furthermore, in still another possible implementation of the present disclosure, the first sending module 1101 further includes:

a first sending unit configured to send the indication information in response to determining to send the non-control channel scheduling data at the preset moment of sending the non-control channel scheduling data;

or a second sending unit configured to send the indication information in response to determining not to send the non-control channel scheduling data at the preset moment of sending the non-control channel scheduling data;

or a third sending unit configured to not send the indication information in response to determining to send the non-control channel scheduling data at the preset moment of sending the non-control channel scheduling data;

or a fourth sending unit configured to not send the indication information in response to determining to send the non-control channel scheduling data at the preset moment of sending the non-control channel scheduling data.

It should be noted that explanations of embodiments of the methods for transmitting the non-control channel scheduling data based on the indication information shown in FIG. 4, FIG. 5, FIG. 6, FIG. 7, FIG. 8 and FIG. 9 are also applicable to the apparatus 1100 for transmitting the non-control channel scheduling data based on the indication information, and will not be repeated here.

The apparatus for transmitting the non-control channel scheduling data based on the indication information provided in embodiments of the present application may determine the time interval between the first moment of sending the indication information and the second moment of sending corresponding non-control channel scheduling data before sending the indication information, and determine whether to send the indication information to the terminal before the preset moment of sending the non-control channel scheduling data according to the time interval. The indication information is configured to indicate parameters of the terminal related to reception of the non-control channel scheduling data. Therefore, by presetting the time interval between the moment of sending the indication information and the corresponding preset sending moment in advance, and first sending the indicating information to the terminal to indicate whether there is scheduling data to be sent to the terminal at the next moment for scheduling data before sending the scheduling data, the terminal receives the scheduling data only when it is determined that the scheduling data at the next receiving moment is useful, which not only prevents the terminal from obtaining useless scheduling data, but also reduces the power consumption of the terminal and enables the terminal to effectively read the corresponding indication information before the preset receiving moment arrives, thus further improving the reliability of receiving the non-control channel scheduling data.

In order to implement the above-mentioned embodiments, the present disclosure also provides a terminal.

The terminal provided in embodiments of the present disclosure includes a processor, a transceiver, a memory and executable programs stored in the memory and executable by the processor. The processor executes the executable programs to implement the method for transmitting the non-control channel scheduling data based on the indication information provided in any one of the above-mentioned technical solutions.

The terminal may be a base station or a terminal as mentioned above.

The processor may include various types of storage medium, which are non-transitory computer storage medium that can continue to remember and store information on the terminal after power failure. Here, the terminal includes a base station or a terminal.

The processor may be connected to the memory via a bus or the like, and configured to read executable programs stored on the memory, such as at least one of FIG. 1 to FIG. 9.

In order to implement the above-mentioned embodiments, the present disclosure also provides a computer storage medium.

The computer storage medium provided in embodiments of the present disclosure stores executable programs. After the executable programs are executed by the processor, it is possible to implement the method for transmitting the non-control channel scheduling data based on the indication information provided in any one of the above-mentioned technical solutions, such as at least one of FIG. 1 to FIG. 9.

Figure 12:
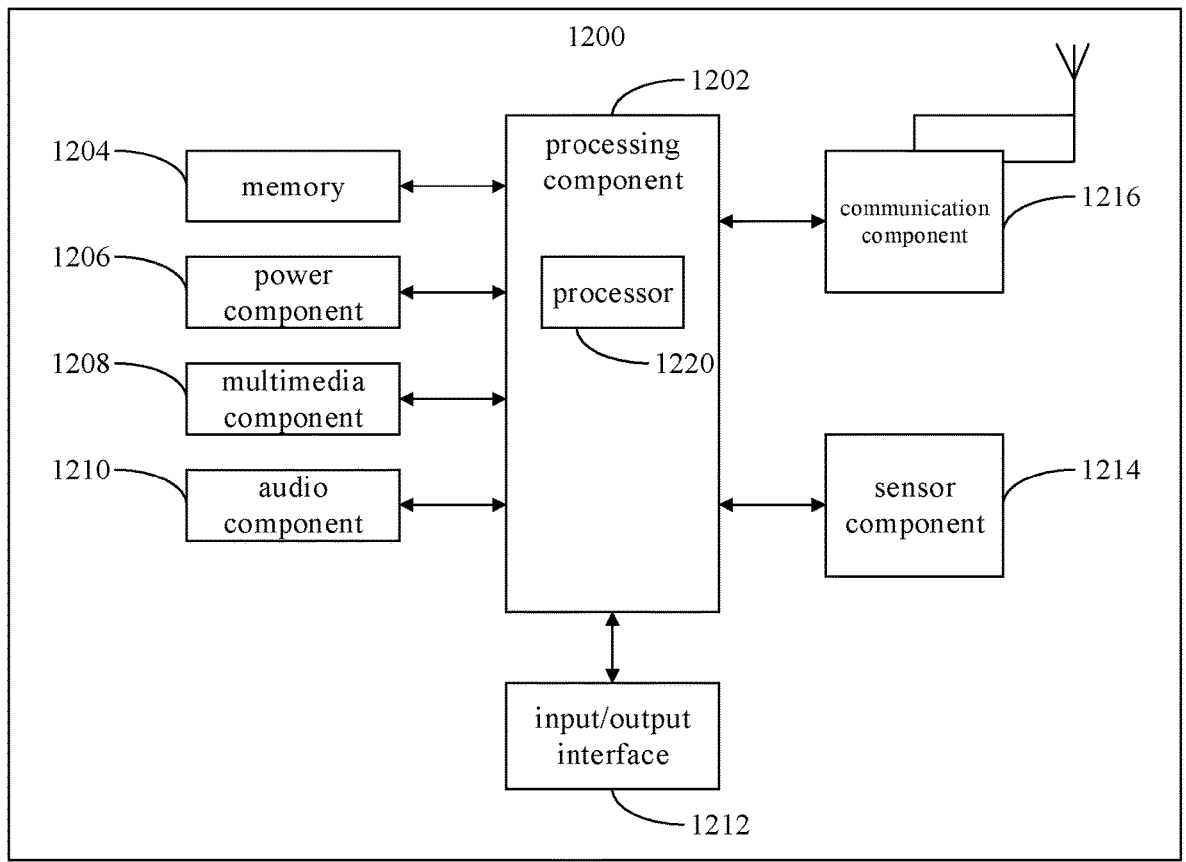
FIG. 12 is a block diagram illustrating a user equipment according to an embodiment of the present disclosure.

FIG. 12 is a block diagram of a user equipment (UE) 1200 according to an embodiment of the present disclosure. For example, the UE 1200 may be a mobile phone, a computer, a digital broadcast terminal, a messaging device, a game console, a tablet device, a medical device, a fitness device, a personal digital assistant, or the like.

As shown in FIG. 12, the UE 1200 may include one or more of the following components: a processing component 1202, a memory 1204, a power component 1206, a multimedia component 1208, an audio component 1210, an input/output (I/O) interface 1212, a sensor component 1214, and a communication component 1216.

The processing component 1202 typically controls overall operations of the UE 1200, such as the operations associated with display, telephone calls, data communications, camera operations, and recording operations. The processing component 1202 may include one or more processors 1220 to execute instructions to perform all or some of the steps in the above-described method. Moreover, the processing component 1202 may include one or more modules which facilitate the interaction between the processing component 1202 and other components. For instance, the processing component 1202 may include a multimedia module to facilitate the interaction between the multimedia component 1208 and the processing component 1202.

The memory 1204 is configured to store various types of data to support the operation of the UE 1200. Examples of such data include instructions for any applications or methods operated on the UE 1200, contact data, phonebook data, messages, pictures, videos, etc. The memory 1204 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1206 provides power to various components of the UE 1200. The power component 1206 may include a power management system, one or more power sources, and any other components associated with the generation, management, and distribution of power in the UE 1200.

The multimedia component 1208 includes a screen providing an output interface between the UE 1200 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense awake time and a pressure associated with the touch or swipe action. In some embodiments, the multimedia component 1208 includes a front camera and/or a rear camera. The front camera and/or the rear camera may receive an external multimedia datum while the UE 1200 is in an operation mode, such as a photographing mode or a video mode. Each of the front camera and the rear camera may be a fixed optical lens system or have focus and optical zoom capability.

The audio component 1210 is configured to output and/or input audio signals. For example, the audio component 1210 includes a microphone (MIC) configured to receive an external audio signal when the UE 1200 is in an operation mode, such as a call mode, a recording mode, and a voice recognition mode. The received audio signal may be further stored in the memory 1204 or transmitted via the communication component 1216. In some embodiments, the audio component 1210 further includes a speaker to output audio signals.

The I/O interface 1212 provides an interface between the processing component 1202 and peripheral interface modules, such as keyboards, click wheels, buttons, and the like.

The buttons may include, but are not limited to, a home button, a volume button, a starting button, and a locking button.

The sensor component 1214 includes one or more sensors to provide status assessments of various aspects of the UE 1200. For instance, the sensor component 1214 may detect an open/closed status of the UE 1200, relative positioning of components, e.g., the display and the keypad, of the UE 1200, a change in position of the UE 1200 or a component of the UE 1200, a presence or absence of user contact with the UE 1200, an orientation or an acceleration/deceleration of the UE 1200, and a change in temperature of the UE 1200. The sensor component 1214 may include a proximity sensor configured to detect the presence of nearby objects without any physical contact. The sensor component 1214 may also include a light sensor, such as a CMOS or CCD image sensor, for use in imaging applications. In some embodiments, the sensor component 1214 may also include an accelerometer sensor, a gyroscope sensor, a magnetic sensor, a pressure sensor, or a temperature sensor.

The communication component 1216 is configured to facilitate communication, wired or wireless, between the UE 1200 and other devices. The UE 1200 can access a wireless network based on a communication standard, such as WI-FI™, 2G, 3G, or a combination thereof. In one illustrative embodiment, the communication component 1216 receives a broadcast signal or broadcast associated information from an external broadcast management system via a broadcast channel. In one illustrative embodiment, the communication component 1216 further includes a NEAR FIELD COMMUNICATION (NFC) module to facilitate short-range communications. For example, the NFC module may be implemented based on a RADIO FREQUENCY IDENTIFICATION (RFID) technology, an INFRARED DATA ASSOCIATION (IrDA) technology, an ULTRA-WIDE-BAND (UWB) technology, a BLUETOOTH™ (BT) technology, and other technologies.

In illustrative embodiments, the UE 1200 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above-described method.

In illustrative embodiments, there is also provided a non-transitory computer-readable storage medium including instructions, such as included in the memory 1204, executable by the processor 1220 in the UE 1200, for performing the above-described method. For example, the non-transitory computer-readable storage medium may be a ROM, a RAM, a CD-ROM, a magnetic tape, a floppy disc, an optical data storage device, and the like.

Figure 13:
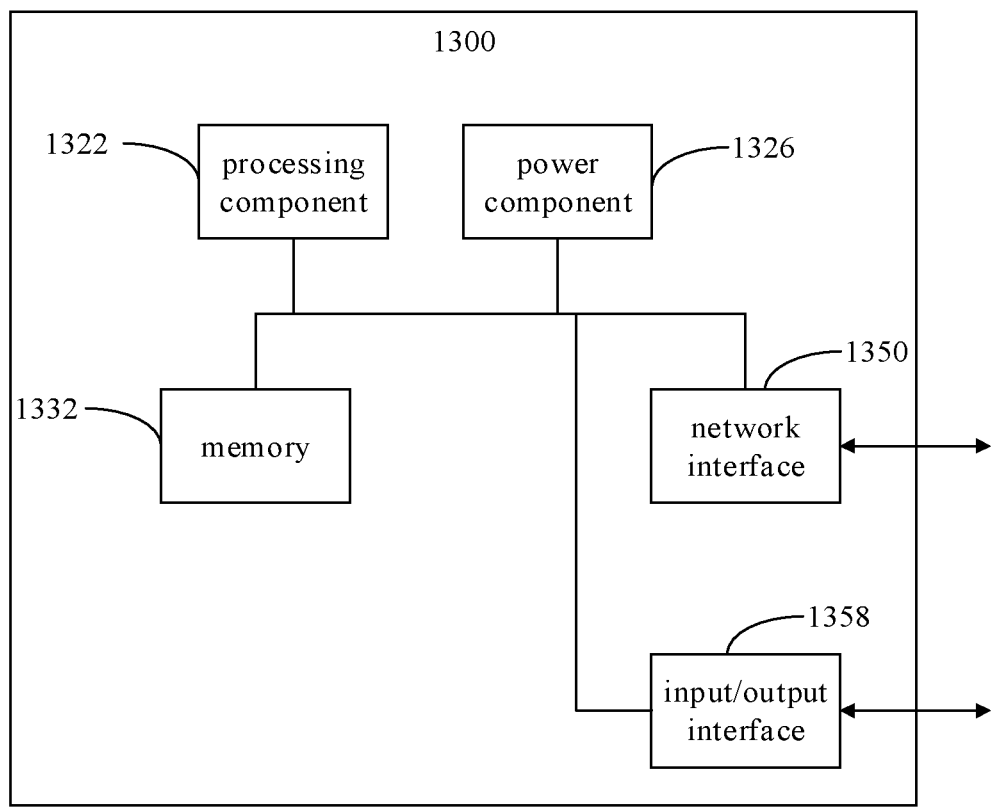
FIG. 13 is a schematic diagram illustrating a base station according to an embodiment of the present disclosure.

FIG. 13 is a schematic diagram illustrating a base station according to an embodiment of the present disclosure. For example, the base station 1300 may be a network device. Referring to FIG. 13, the base station 1300 includes a processing component 1322 that further includes one or more processors, and a memory resource represented by a memory 1332 for storing instructions that may be executed by the processing component 1322 such as application programs. The application program stored in the memory 1332 may include one or more modules each corresponding to a set of instructions. In addition, the processing component 1322 is configured to execute instructions to perform the above-mentioned methods performed by the base station, such as the methods shown in FIG. 4 to FIG. 7.

The base station 1300 may also include a power component 1326 configured to perform power management of the base station 1300, a wired or wireless network interface 1350 configured to connect the base station 1300 to a network, and an input/output (I/O) interface 1358. The base station 1300 can operate based on an operating system stored in the memory 1332, such as Windows Server™, Mac OS X™, Unix™, Linux™, FreeBSD™ or the like.

Other embodiments of the present disclosure will be apparent to those skilled in the art from consideration of the specification and practice of the disclosure disclosed here. The present disclosure is intended to cover any variations, uses, or adaptations of the disclosure following the general principles thereof and including such departures from the disclosure as come within known or customary practice in the art. It is intended that the specification and examples be considered as exemplary only, and the scope and spirit of the present disclosure are indicated by the attached claims.

It will be appreciated that the present disclosure is not limited to the exact construction that has been described above and illustrated in the accompanying drawings, and that various modifications and changes can be made without departing from the scope thereof. The scope of the present disclosure is limited only by the attached claims.

What is claimed is:

1. A method for receiving non-control channel scheduling data based on indication information, comprising:
  determining whether the indication information is received before a preset moment of receiving the non-control channel scheduling data; wherein the indication information is configured to indicate parameters of a terminal related to reception of the non-control channel scheduling data;
  wherein the method further comprises:
  determining a current empty detection probability of non-control channel scheduling data of the terminal; and
  sending an indication information acquiring request to a base station in case that the current empty detection probability is greater than a first threshold.

2. The method according to claim 1, wherein the indication information comprises at least one of: first information for instructing the terminal to receive the non-control channel scheduling data, or second information for instructing the terminal not to receive the non-control channel scheduling data.

3. The method according to claim 1, wherein the indication information is carried by a digital sequence.

4. The method according to claim 1, further comprising:
  determining a time interval between a first moment of receiving the indication information and a second moment of receiving corresponding non-control channel scheduling data.

5. The method according to claim 4, wherein determining the time interval between the first moment of receiving the indication information and the second moment of receiving the corresponding non-control channel scheduling data comprises:
  determining the time interval between the first moment of receiving the indication information and the second moment of receiving the corresponding non-control channel scheduling data according to at least one of parameters, wherein at least one of the parameters is a load capability of the terminal, a network configuration, or a communication protocol.

6. The method according to claim 1, further comprising:
  receiving an activation instruction sent by a base station, wherein the activation instruction is configured to instruct the terminal to activate a function of receiving the indication information.

7. The method according to claim 1, wherein the non-control channel scheduling data is semi-persistent scheduling (SPS) information.

8. The method according to claim 1, further comprising:
  determining to receive the non-control channel scheduling data at the preset moment of receiving the non-control channel scheduling data in response to receiving the indication information;
  or
  determining not to receive the non-control channel scheduling data at the preset moment of receiving the non-control channel scheduling data in response to receiving the indication information;
  or
  determining to receive the non-control channel scheduling data at the preset moment of receiving the non-control channel scheduling data in response to not receiving the indication information;
  or
  determining not to receive the non-control channel scheduling data at the preset moment of receiving the non-control channel scheduling data in response to not receiving the indication information.

9. A method for transmitting non-control channel scheduling data based on indication information, comprising:
  determining whether to send the indication information to a terminal before a preset moment of sending the non-control channel scheduling data, wherein the indication information is configured to indicate parameters of the terminal related to reception of the non-control channel scheduling data;
  wherein the method further comprises:
  sending an activation instruction to the terminal, wherein the activation instruction is configured to instruct the terminal to activate a function of receiving the indication information;
  wherein before sending the activation instruction to the terminal, the method further comprises:
  determining that a current empty detection probability of non-control channel scheduling data of the terminal is greater than a first threshold.

10. The method according to claim 9, wherein the indication information comprises at least one of: first information for instructing the terminal to receive the non-control channel scheduling data, or second information for instructing the terminal not to receive the non-control channel scheduling data.

11. The method according to claim 9, wherein the indication information is carried by a digital sequence.

12. The method according to claim 9, further comprising:
  determining a time interval between a first moment of sending the indication information and a second moment of sending corresponding non-control channel scheduling data.

13. The method according to claim 12, wherein determining the time interval between the first moment of sending the indication information and the second moment of sending the corresponding non-control channel scheduling data comprises:
  determining the time interval between the first moment of sending the indication information and the second moment of sending the corresponding non-control channel scheduling data according to at least one of parameters, wherein at least one of the parameters is a load capability of the terminal, a network configuration, or a communication protocol.

14. The method according to claim 9, further comprising: receiving an indication information acquiring request sent by the terminal.

15. The method according to claim 9, wherein sending indication information comprises:

sending the indication information in response to determining to send the non-control channel scheduling data at the preset moment of sending the non-control channel scheduling data;

or sending the indication information in response to determining not to send the non-control channel scheduling data at the preset moment of sending the non-control channel scheduling data;

or not sending the indication information in response to determining to send the non-control channel scheduling data at the preset moment of sending the non-control channel scheduling data;

or not sending the indication information in response to determining to send the non-control channel scheduling data at the preset moment of sending the non-control channel scheduling data.

16. A communication device, comprising:

a transceiver;

a memory;

a processor connected with the transceiver and the memory respectively, and configured to execute instructions stored in the memory and executable by a computer to control wireless signal transmission and reception of the transceiver, and to:

determine whether an indication information is received before a preset moment of receiving a non-control channel scheduling data; wherein the indication information is configured to indicate parameters of a terminal related to reception of the non-control channel scheduling data;

determining a current empty detection probability of non-control channel scheduling data of the terminal; and sending an indication information acquiring request to a base station in case that the current empty detection probability is greater than a first threshold;

or determine whether to send the indication information to a terminal before a preset moment of sending the non-control channel scheduling data, wherein the indication information is configured to indicate parameters of the terminal related to reception of the non-control channel scheduling data;

determining that a current empty detection probability of non-control channel scheduling data of the terminal is greater than a first threshold; and sending an activation instruction to the terminal, wherein the activation instruction is configured to instruct the terminal to activate a function of receiving the indication information.

17. The communication device according to claim 16, wherein the indication information comprises at least one of: first information for instructing the terminal to receive the non-control channel scheduling data, or second information for instructing the terminal not to receive the non-control channel scheduling data.

* * * * *